US006554704B2

(12) United States Patent
Nicastro et al.

(10) Patent No.: US 6,554,704 B2
(45) Date of Patent: Apr. 29, 2003

(54) MAZE-BASED GAME FOR A GAMING MACHINE

(75) Inventors: John P. Nicastro, Chicago, IL (US); John P. Nicastro, II, Chicago, IL (US); Peter R. Anderson, Chicago, IL (US); Michael P. Casey, Chicago, IL (US); John J. Giobbi, Northbrook, IL (US)

(73) Assignee: WMS Gaming Inc., Waukegan, IL (US)

( * ) Notice: Subject to any disclaimer, the term of this patent is extended or adjusted under 35 U.S.C. 154(b) by 0 days.

(21) Appl. No.: 09/911,215

(22) Filed: Jul. 23, 2001

(65) Prior Publication Data

US 2002/0022509 A1 Feb. 21, 2002

Related U.S. Application Data

(60) Provisional application No. 60/225,933, filed on Aug. 17, 2000.

(51) Int. Cl.[7] ................................................ A63F 13/00
(52) U.S. Cl. ........................ 463/20; 463/38; 273/143 R
(58) Field of Search ................................ 463/7, 15–20, 463/36–38; 273/143 R

(56) References Cited

U.S. PATENT DOCUMENTS

| | | | | | |
|---|---|---|---|---|---|
| 4,582,324 A | | 4/1986 | Koza et al. | ............. | 273/138 A |
| 5,001,632 A | * | 3/1991 | Hall-Tipping | ................ | 463/23 |
| 5,618,045 A | * | 4/1997 | Kagan et al. | ................. | 463/40 |
| 6,089,977 A | * | 7/2000 | Bennett | .................. | 273/143 R |
| 6,220,593 B1 | * | 4/2001 | Pierce et al. | ............ | 273/121 B |
| 6,270,411 B1 | * | 8/2001 | Gura et al. | .............. | 273/138.2 |
| 6,290,600 B1 | * | 9/2001 | Glasson | .................. | 273/143 R |
| 6,419,579 B1 | * | 7/2002 | Bennett | ....................... | 463/20 |
| 6,443,837 B1 | * | 9/2002 | Jaffe et al. | .................... | 463/16 |

* cited by examiner

*Primary Examiner*—David A. Scherbel
*Assistant Examiner*—Patrick Buechner
(74) *Attorney, Agent, or Firm*—Jenkens & Gilchrist

(57) ABSTRACT

A maze-based game of chance for a gaming machine is controlled by a processor in response to a wager. The maze-based game includes an award-generating indicator movable along a plurality of different intersecting paths. The plurality of paths contain a plurality of consumable elements. The award-generating indicator generates an award based on a randomly selected outcome as the award-generating indicator visually consumes the elements.

44 Claims, 18 Drawing Sheets

*Fig. 15a*
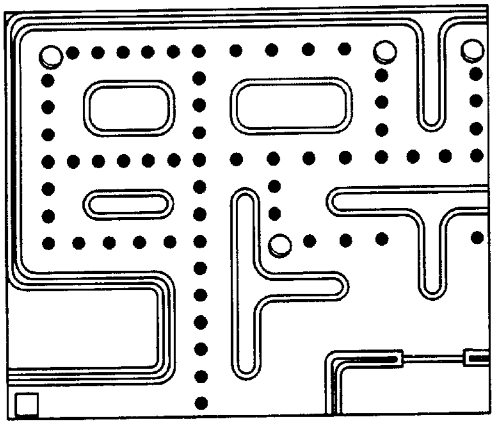
*Fig. 15b*
9,9,9,9,9,9,9,9,9,9,9,9,9,9,9,9,
9,2,1,1,1,1,1,1,1,1,1,1,2,9,9,2,
9,1,9,9,9,9,1,9,9,9,9,9,1,9,9,1,
9,1,9,9,9,9,1,9,9,9,9,9,1,9,9,1,
9,1,9,9,9,9,1,9,9,9,9,9,1,9,9,1,
9,1,1,1,1,1,1,1,1,1,1,1,1,1,1,1,
9,1,9,9,9,9,1,9,9,1,9,9,9,9,9,9,
9,1,9,9,9,9,1,9,9,1,9,9,9,9,9,9,
9,1,1,1,1,1,1,9,9,2,1,1,1,9,9,1,
9,9,9,9,9,9,1,9,9,9,9,9,0,9,9,0,
9,9,9,9,9,9,1,9,9,9,9,9,0,9,9,0,
9,9,9,9,9,9,1,9,9,0,0,0,0,0,0,0,
9,9,9,9,9,9,1,9,9,0,9,9,9,9,9,9,
9,9,9,9,9,9,1,9,9,0,9,9,9,9,9,9,
3,0,0,0,0,0,1,0,0,0,9,9,9,9,9,9,
*Fig. 16a*
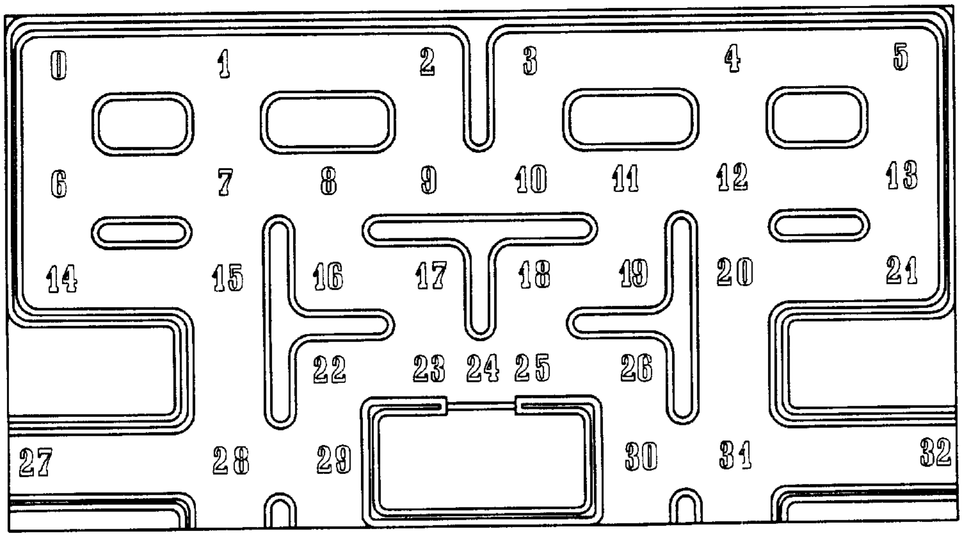

Fig. 16b

GLOSSARY:
- AR=ROW NUMBER IN GRAPHICAL ARRAY
- AC=COLUMN NUMBER IN GRAPHICAL ARRAY
- NN=THE NODE NORTH OF THIS NODE
- NE=THE NODE EAST OF THIS NODE
- NS=THE NODE SOUTH OF THIS NODE
- NW=THE NODE WEST OF THIS NODE

| AR | AC | NN | NE | NS | NW | |
|---|---|---|---|---|---|---|
| 1, | 1, | -1, | 1, | 6, | -1, | // NODE 0 |
| 6, | 1, | -1, | 2, | 7, | 0, | // NODE 1 |
| 12, | 1, | -1, | -1, | 9, | 1, | // NODE 2 |
| 15, | 1, | -1, | 4, | 10, | -1, | // NODE 3 |
| 21, | 1, | -1, | 5, | 12, | 3, | // NODE 4 |
| 26, | 1, | -1, | -1, | 13, | 4, | // NODE 5 |
| 1, | 5, | 0, | 7, | 14, | -1, | // NODE 6 |
| 6, | 5, | 1, | 18, | 15, | 6, | // NODE 7 |
| 9, | 5, | -1, | 9, | 16, | 7, | // NODE 8 |
| 12, | 5, | 2, | 10, | -1, | 8, | // NODE 9 |
| 15, | 5, | 3, | 11, | -1, | 9, | // NODE 10 |
| 18, | 5, | -1, | 12, | 19, | 10, | // NODE 11 |
| 21, | 5, | 4, | 13, | 20, | 11, | // NODE 12 |
| 26, | 5, | 5, | -1, | 21, | 12, | // NODE 13 |
| 1, | 8, | 6, | 15, | -1, | -1, | // NODE 14 |
| 6, | 8, | 7, | -1, | 28, | 14, | // NODE 15 |
| 9, | 8, | 8, | 17, | -1, | -1, | // NODE 16 |
| 12, | 8, | -1, | -1, | 23, | 16, | // NODE 17 |
| 15, | 8, | -1, | 19, | 25, | -1, | // NODE 18 |
| 18, | 8, | 11, | -1, | -1, | 18, | // NODE 19 |
| 21, | 8, | 12, | 21, | 31, | -1, | // NODE 20 |
| 26, | 8, | 13, | -1, | -1, | 20, | // NODE 21 |
| 9, | 11, | -1, | 23, | 29, | -1, | // NODE 22 |
| 12, | 11, | 17, | 25, | -1, | 22, | // NODE 23 |
| 13, | 11, | -1, | 25, | -1, | 23, | // NODE 24 |
| 15, | 11, | 18, | 26, | -1, | 23, | // NODE 25 |
| 18, | 11, | -1, | -1, | 30, | 25, | // NODE 26 |
| 0, | 14, | -1, | 28, | -1, | 32, | // NODE 27 |
| 6, | 14, | 15, | 29, | 36, | 27, | // NODE 28 |
| 9, | 14, | 22, | -1, | 33, | 28, | // NODE 29 |
| 18, | 14, | 26, | 31, | 34, | -1, | // NODE 30 |
| 21, | 14, | 20, | 32, | 41, | 30, | // NODE 31 |
| 27, | 14, | -1, | 27, | -1, | 31, | // NODE 32 |

MAZE-BASED GAME FOR A GAMING MACHINE

CROSS-REFERENCE TO RELATED APPLICATION

This application claims the benefit of priority of U.S. Provisional Patent Application No. 60/225,933, filed Aug. 17, 2000.

FIELD OF THE INVENTION

The present invention relates generally to gaming machines and, more particularly, to a maze-based game for a gaming machine in which an award-generating indicator moves through a maze.

BACKGROUND OF THE INVENTION

Gaming machines, such as slot machines, video poker machines and the like, have been a cornerstone of the gaming industry for several years. Generally, the popularity of such machines with players is dependent on the likelihood (or perceived likelihood) of winning money at the machine and the intrinsic entertainment value of the machine relative to other available gaming options. Where the available gaming options include a number of competing machines and the expectation of winning each machine is roughly the same (or believed to be the same), players are most likely to be attracted to the most entertaining and exciting of the machines. Consequently, shrewd operators strive to employ the most entertaining and exciting machines available because such machines attract frequent play and, hence, increase profitability to the operator. Accordingly, in the competitive gaming machine industry, there is a continuing need for gaming machine manufacturers to produce new types of games, or enhancements to existing games, which will attract frequent play by enhancing the entertainment value and excitement associated with the game.

One concept that has been successfully employed to enhance the entertainment value of a game is the concept of a "secondary" or "bonus" game that may be played in conjunction with a "basic" game. The bonus game may comprise any type of game, either similar to or completely different from the basic game, which is entered upon the occurrence of a selected event or outcome of the basic game. Because the bonus game concept offers tremendous advantages in player appeal and excitement relative to other known games, and because such games are attractive to both players and operators, there is a continuing need to develop new features for bonus games to satisfy the demands of players and operators. Preferably, such new bonus game features will maintain, or even further enhance, the level of player excitement offered by bonus games heretofore known in the art. The present invention is directed to satisfying these needs.

SUMMARY OF THE INVENTION

In accordance with one aspect of the present invention, a maze-based game of chance for a gaming machine is controlled by a processor in response to a wager. The maze-based game comprises an award-generating indicator movable along a plurality of different intersecting paths. The plurality of paths contain a plurality of consumable elements. The award-generating indicator generates an award based on a randomly selected outcome as the award-generating indicator visually consumes the elements. The game may include at least one award-ending indicator movable along the plurality of different intersecting paths. The game ends in response to the awardending indicator intersecting the award-generating indicator.

In accordance with another aspect of the present invention, a game of chance for a gaming machine is controlled by a processor in response to a wager. The game comprises a plurality of symbol bearing reels that are rotated and stopped to place symbols on the reels in visual association with a display area. The symbols include an award-generating symbol and at least one consumable symbol. The award-generating symbol visually consumes the consumable symbol and generates an award in response to the award-generating symbol and the consumable symbol appearing in the display area in a predetermined arrangement.

BRIEF DESCRIPTION OF THE DRAWINGS

The foregoing and other advantages of the invention will become apparent upon reading the following detailed description and upon reference to the drawings. Several of the drawings contain the PAC-MAN® trademark, which is a registered trademark, owned by Namco Ltd., Inc.

FIG. 15*a* depicts a portion of a maze employed in the maze-based bonus game.

FIG. 15*b* is a graphical array describing how the maze portion in FIG. 15*a* is laid out graphically.

FIG. 16*a* depicts another maze portion and the location of nodes in that maze portion.

FIG. 16*b* is a node connectivity array describing how the nodes for the maze portion in FIG. 16*a* connect with each other.

Figure 1:
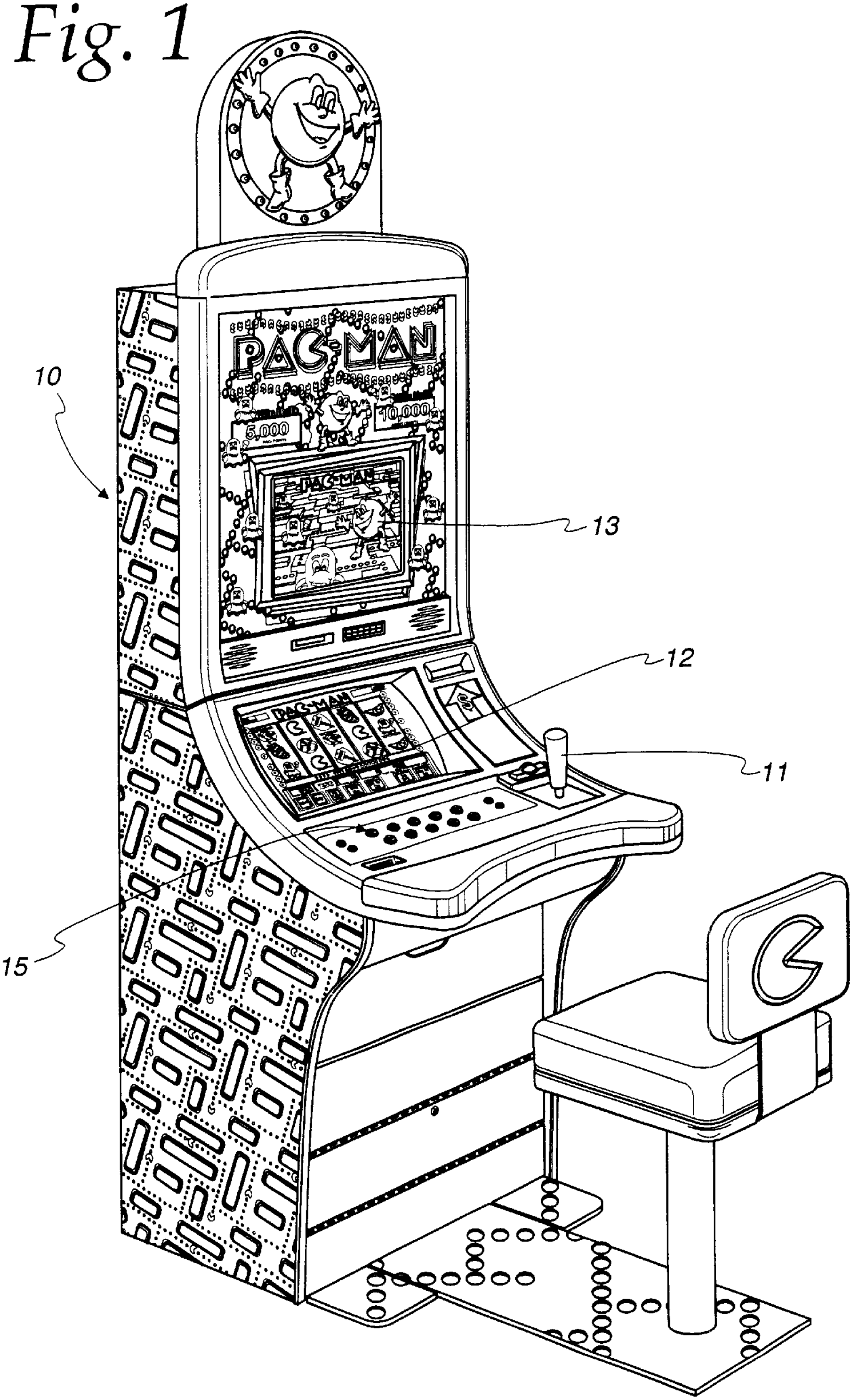
FIG. 1 is a perspective view of a gaming machine embodying the present invention.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DESCRIPTION OF ILLUSTRATIVE EMBODIMENTS

Turning now to the drawings and referring initially to FIG. 1, there is depicted a gaming machine 10 that may be used to implement various bonus games including a maze-based bonus game. Further, the gaming machine 10 may be in a stand-alone setting or may be part of a bank of gaming machines. The gaming machine 10 includes a primary display 12 and an optional secondary display 13. The primary display 12 may be either a mechanical or video display. If the primary display 12 is a mechanical display, the secondary display 13 is provided and is preferably a video display in the form of a dot matrix, CRT, LED, LCD, electro-luminescent, or other type of video display known in the art. If the primary display 12 is a video display, it is preferably outfitted with a touch screen and the secondary display 13 is optional. The gaming machine 10 may include a joystick 11 operable by a player to control movement of a bonus-generating character (e.g., PAC-MAN) through a maze depicted on the secondary display 13 during the maze-based bonus game.

The gaming machine 10 is operable to play a game of chance entitled PAC-MAN. The PAC-MAN game features a basic slot game with five simulated spinning reels and various bonus games. One of the bonus games is a maze-based bonus game featuring a bonus-generating character (e.g., PAC-MAN) moving through a maze and consuming bonus elements while being chased by bonus-ending characters (e.g., ghosts). It will be appreciated, however, that the game of chance may be implemented with themes other than the PAC-MAN theme.

Figure 2:
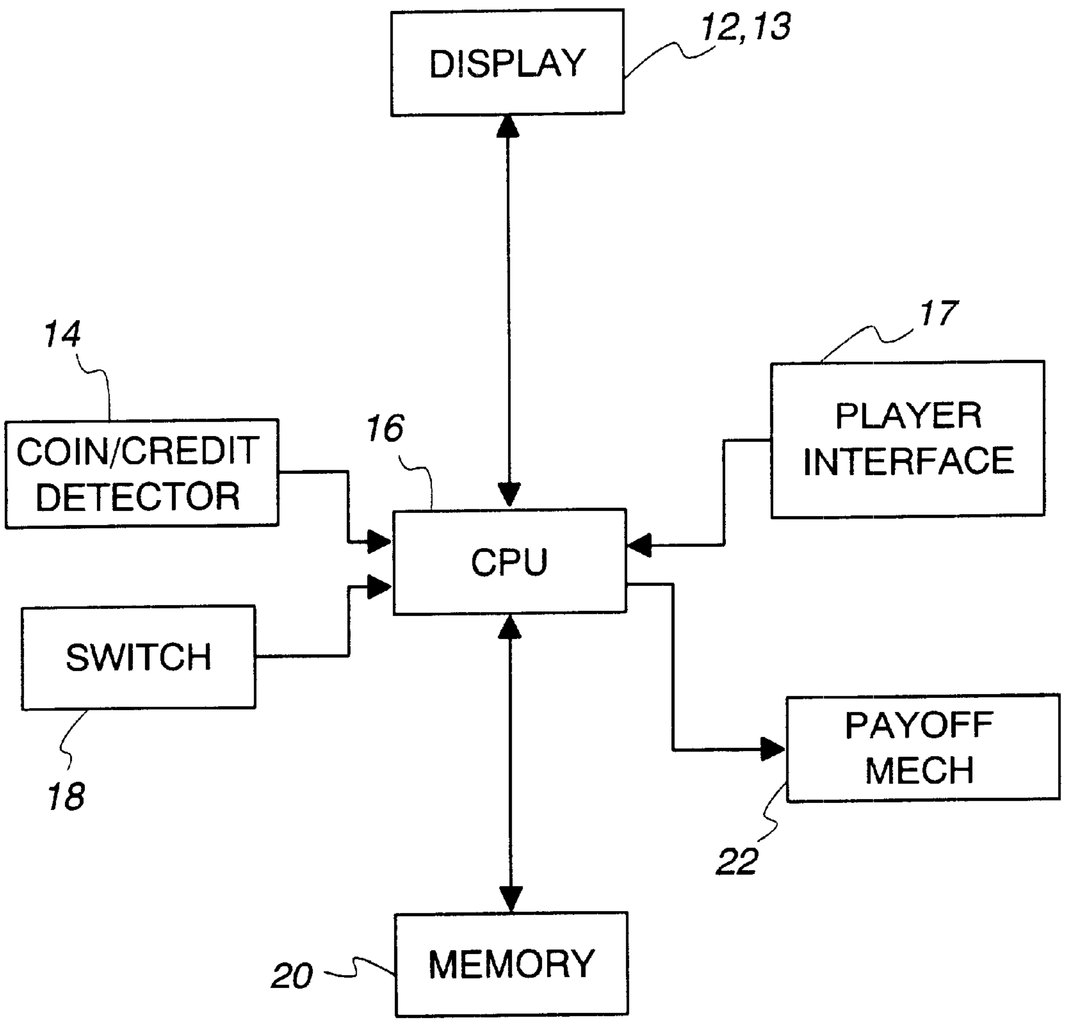
FIG. 2 is a block diagram of a control system suitable for operating the gaming machine.

FIG. 2 is a block diagram of a control system suitable for operating the gaming machine 10. Coin/credit detector 14 signals a central processing unit (CPU) 16 when a player has inserted a number of coins or played a number of credits. Then, the CPU 16 operates to execute a game program that causes the primary display 12 to display the basic game that includes simulated symbol-bearing reels. The player may select the number of pay lines to play and the amount to wager via a player interface 17 having touch screen and/or push-button input keys. The basic game commences in response to the player activating a switch 18 (e.g., by pulling a lever or pushing a button), causing the CPU 16 to set the reels in motion, randomly select a game outcome, and then stop the reels to display symbols corresponding to the pre-selected game outcome. In one embodiment, certain of the basic game outcomes cause the CPU 16 to enter a bonus mode causing one or both of the displays 12 and 13 to show some type of bonus game.

A system memory 20 stores control software, operational instructions, and data associated with the gaming machine 10. In one embodiment, the memory 20 comprises a separate read-only memory (ROM) and battery-backed random-access memory (RAM). It will be appreciated, however, that the system memory 20 may be implemented on any of several alternative types of memory structures or may be implemented on a single memory structure. A payoff mechanism 22 is operable in response to instructions from the CPU 16 to award a payoff of coins or credits to the player in response to certain winning outcomes that may occur in the basic game or bonus games. The payoff amounts corresponding to certain combinations of symbols in the basic game are predetermined according to a pay table stored in system memory 20. The payoff amounts corresponding to certain outcomes of the bonus games are also stored in system memory 20.

Figure 3:
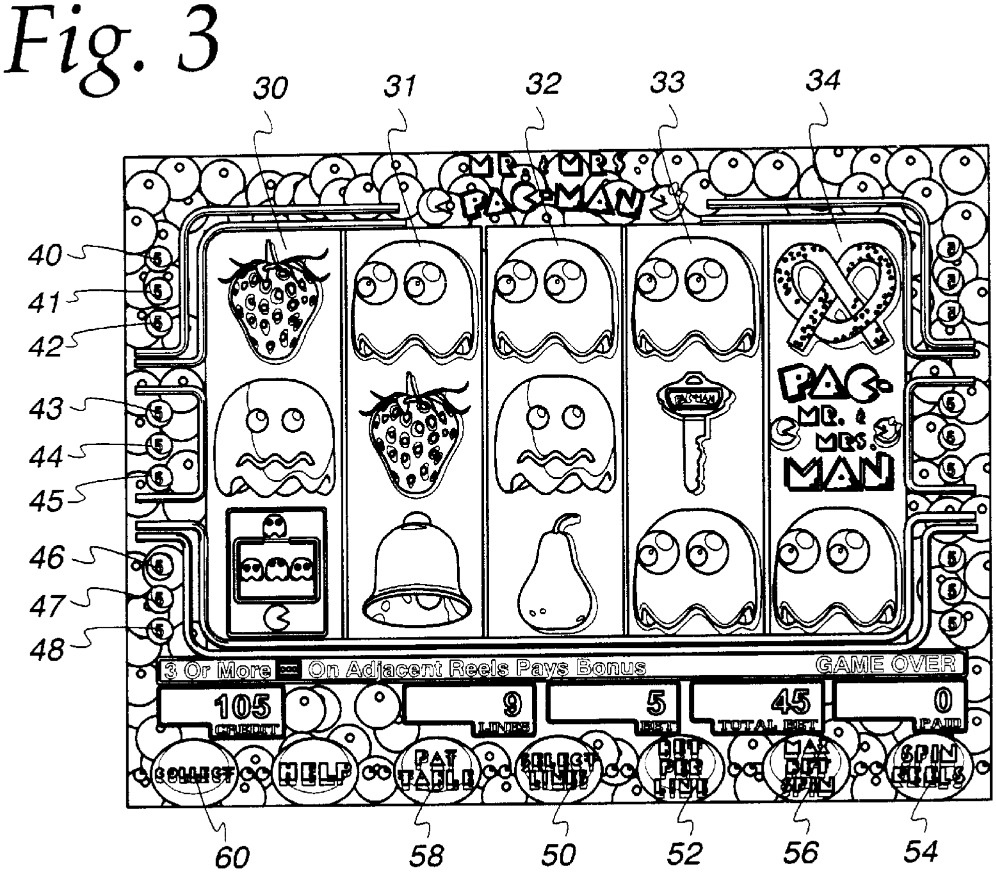
FIG. 3 is a display screen capture showing a basic slot game played on the gaming machine.

As shown in FIG. 3, the PAC-MAN basic game is implemented on the primary display 12 on five video simulated spinning reels 30, 31, 32, 33 and 34 (hereinafter "reels") with nine pay lines 40–48. Each of the pay lines 40–48 extends through one symbol on each of the five reels 30–34. Generally, game play is initiated by inserting a number of coins or playing a number of credits, causing the CPU 16 (FIG. 2) to activate a number of pay lines corresponding to the number of coins or credits played. In one embodiment, the player selects the number of pay lines (between one and nine) to play by pressing a "Select Lines" key 50 on the display 12. The player then chooses the number of coins or credits to bet on the selected pay lines by pressing a "Bet Per Line" key 52.

After activation of the pay lines, the reels 30–34 may be set in motion by touching a "Spin Reels" key 54 or, if the player wishes to bet the maximum amount per line, by using a "Max Bet Spin" key 56 on the display 12. Alternatively, other mechanisms such as, for example, a lever or push button may be used to set the reels in motion. The CPU 16 uses a random number generator to select a game outcome (e.g., "basic" game outcome) corresponding to a particular set of reel "stop positions." The CPU 16 then causes each of the video reels 30–34 to stop at the appropriate stop position. Video symbols are displayed on the reels 30–34 to graphically illustrate the reel stop positions and indicate whether the stop positions of the reels represent a winning game outcome.

Winning basic game outcomes (e.g., symbol combinations resulting in payment of coins or credits) are identifiable to the player by a pay table. In one embodiment, the pay table is affixed to the machine 10 and/or displayed by the display 12 in response to a command by the player (e.g., by pressing a "Pay Table" key 58). A winning basic game outcome occurs when the symbols appearing on the reels 30–34 along an active pay line correspond to one of the winning combinations on the pay table. A winning combination, for example, could be three matching symbols along an active pay line, where the award is greater as the number of matching symbols along the active pay line increases. If the displayed symbols stop in a winning combination, the game credits the player an amount corresponding to the award in the pay table for that combination multiplied by the amount of credits bet on the winning pay line. The player may collect the amount of accumulated credits by pressing a "Collect" key 60. The game optionally employs a wild symbol that can serve as another symbol to create a winning combination, but preferably is not wild for any symbols used to trigger the bonus game. In one implementation, the winning combinations start from the first reel 30 (left to right) and span adjacent reels. In an alternative implementation, the winning combinations start from either the first reel 30 (left to right) or the fifth reel 34 (right to left) and span adjacent reels.

Included among the plurality of basic game outcomes are start-bonus outcomes for triggering play of associated bonus games. A start-bonus outcome may be defined in any number of ways. For example, a start-bonus outcome occurs when a special start-bonus symbol or a special combination of symbols appears on one or more of the reels 30–34. The start-bonus outcome may require the combination of symbols to appear along an active pay line, or may alternatively require that the combination of symbols appear anywhere on the display regardless of whether the symbols are along an active pay line. The appearance of a start-bonus outcome causes the processor to shift operation from the basic game to an associated bonus game. Examples of possible bonus games are described below.

Figure 4:
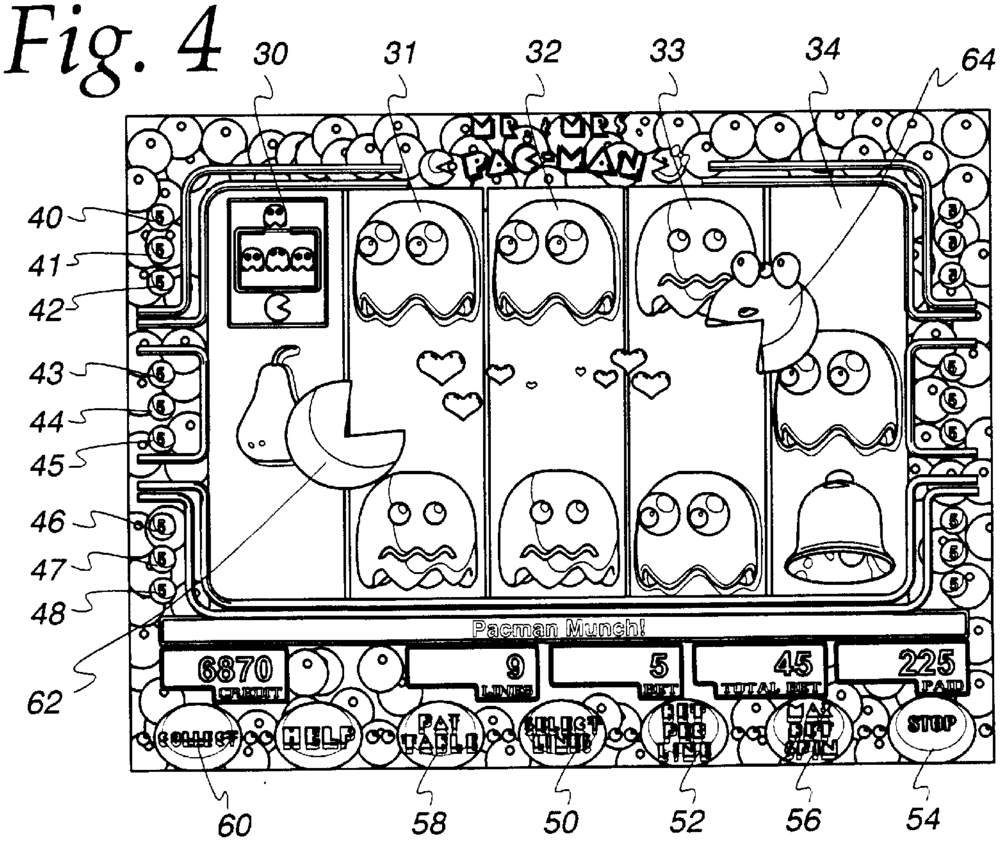
FIGS. 4 and 5 are display screen captures showing a "kiss" bonus feature triggered by the basic slot game.
Figure 5:
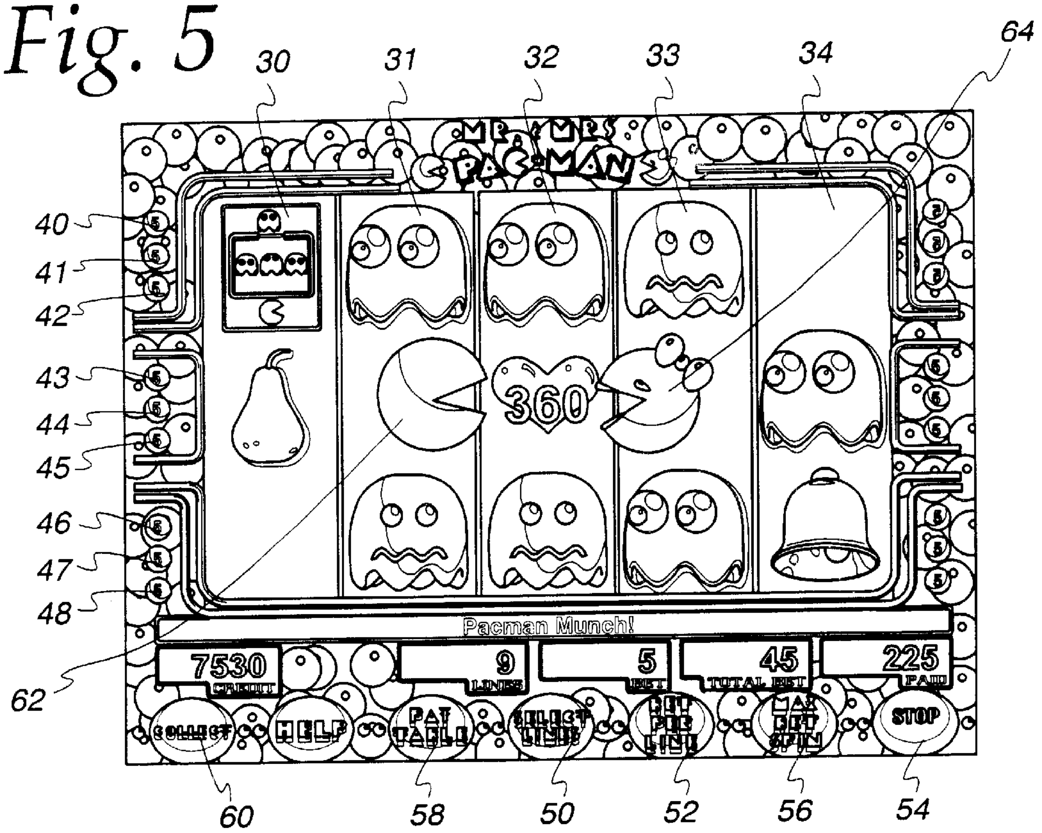
Figure 6:
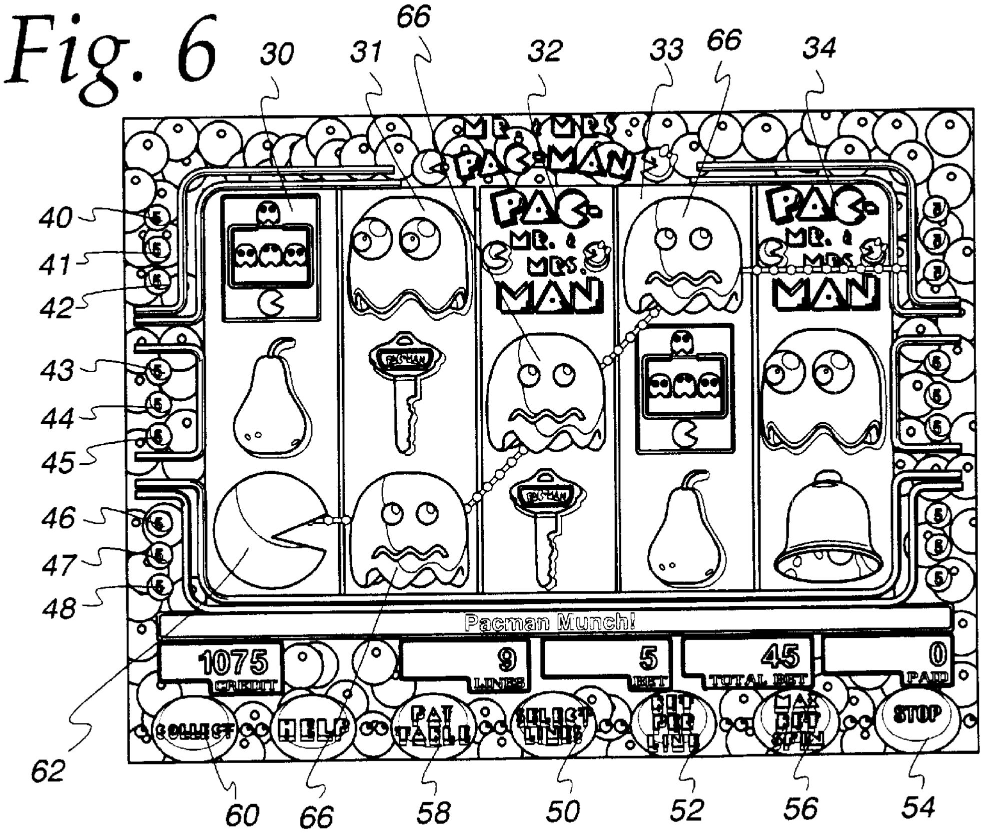
FIGS. 6 and 7 are display screen captures showing a "munch" bonus feature triggered by the basic slot game.

Referring to FIGS. 4 and 5, a "kiss" bonus feature on the primary display 12 is triggered by a PAC-MAN symbol 62 and a MS. PAC-MAN symbol 64 appearing anywhere at the same time. The PAC-MAN symbol 62 and the MS. PAC- MAN symbol 64 move toward each other from their respective reel stop positions, "kiss" each other, and reveal a bonus equal to a randomly selected multiplier times the total bet. In FIG. 6, for example, a randomly selected multiplier of eight on a total bet of 45 credits yields a bonus equal to 360 credits.

Figure 7:
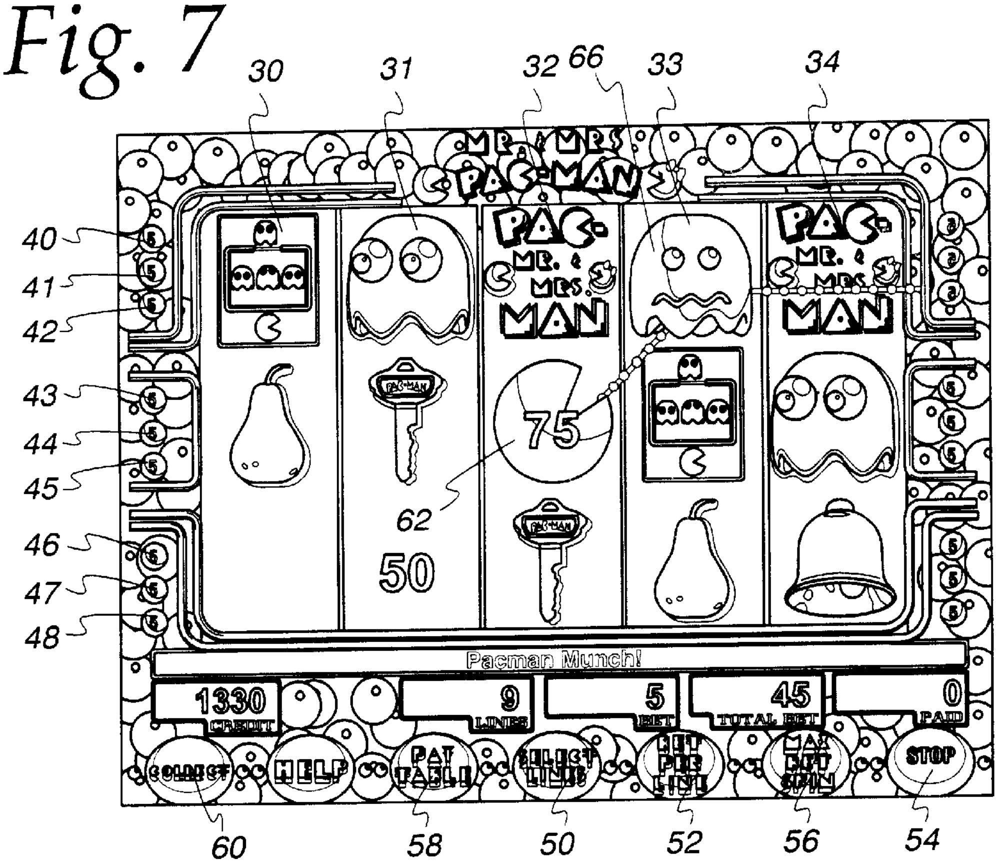
Figure 8:
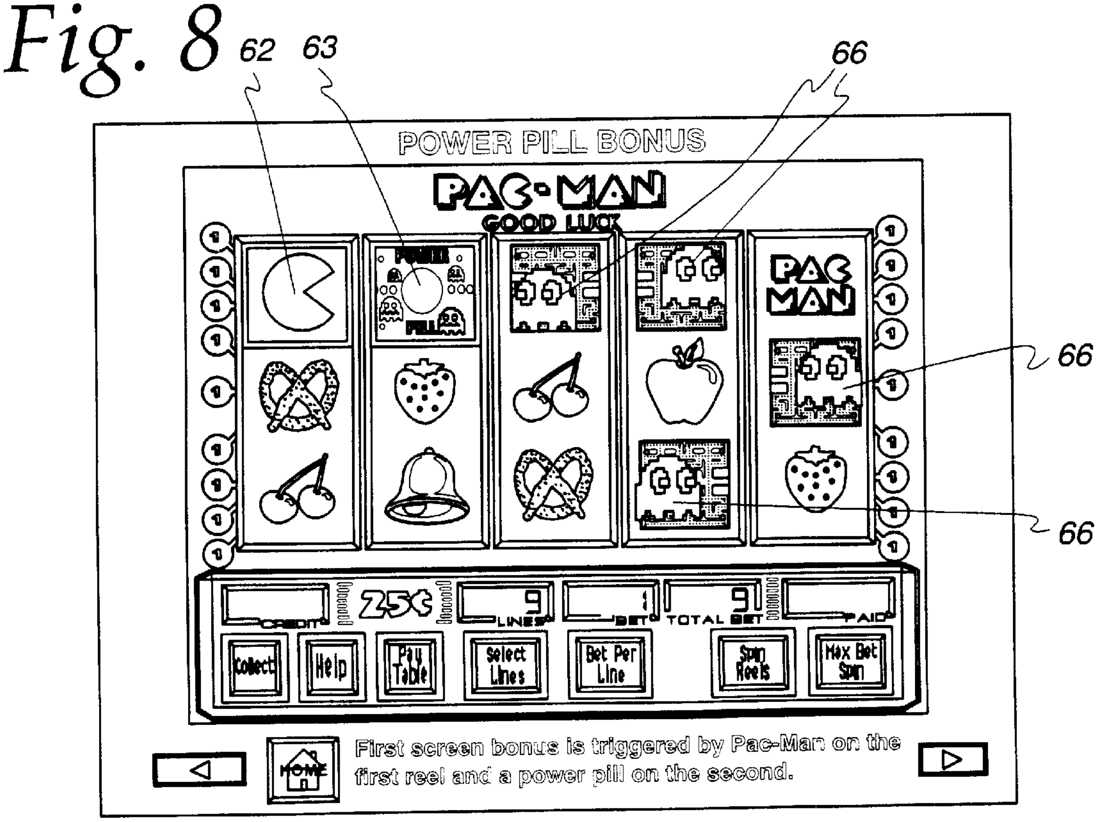
FIGS. 8 and 9*a–c* are display screen captures showing an alternative embodiment of the "munch" bonus feature.
Figure 9A:
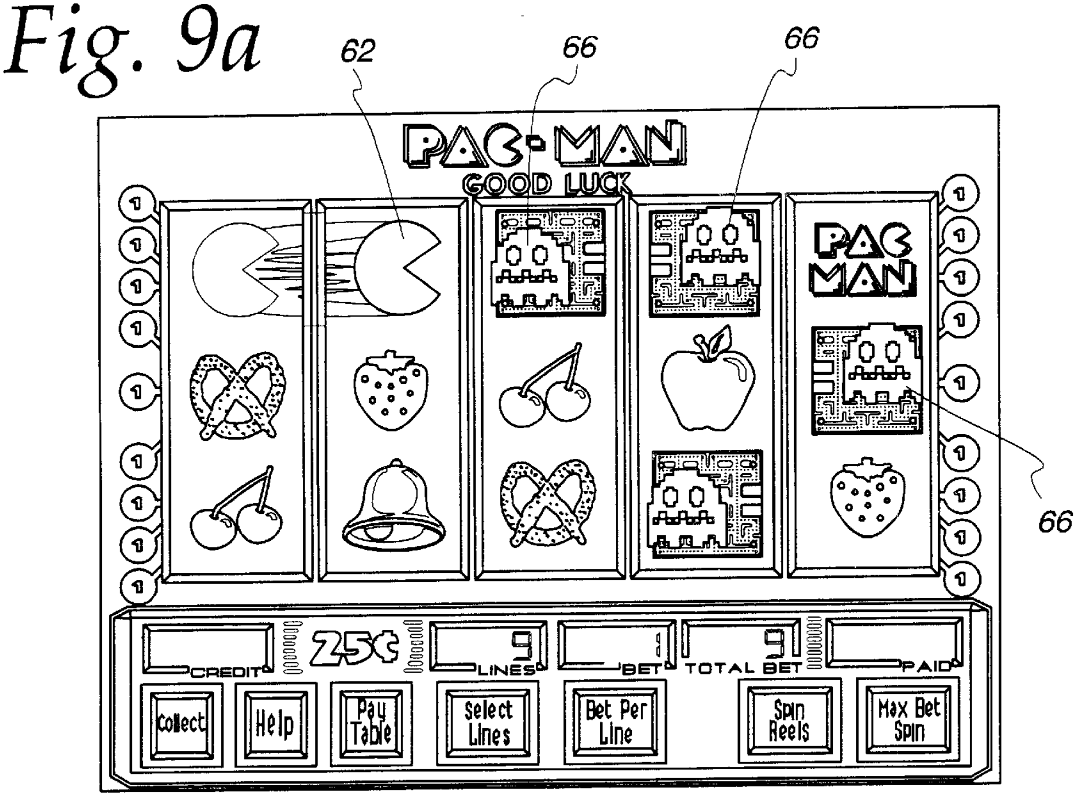
Figure 9B:
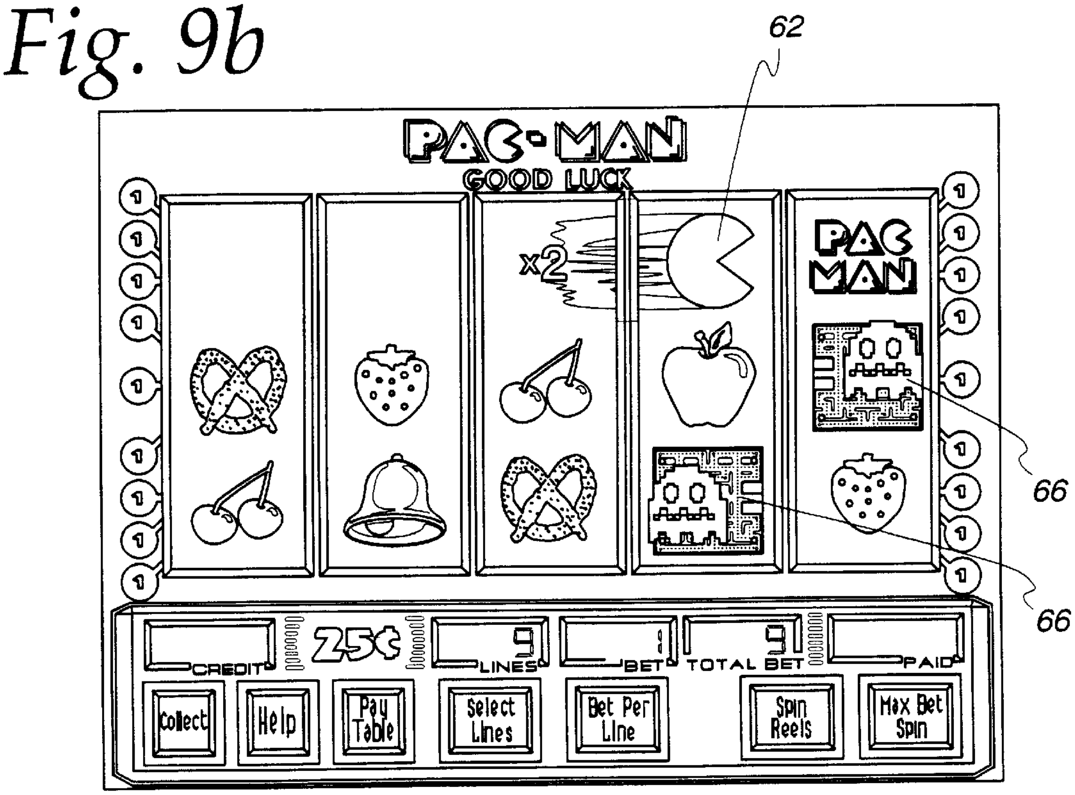
Figure 9C:
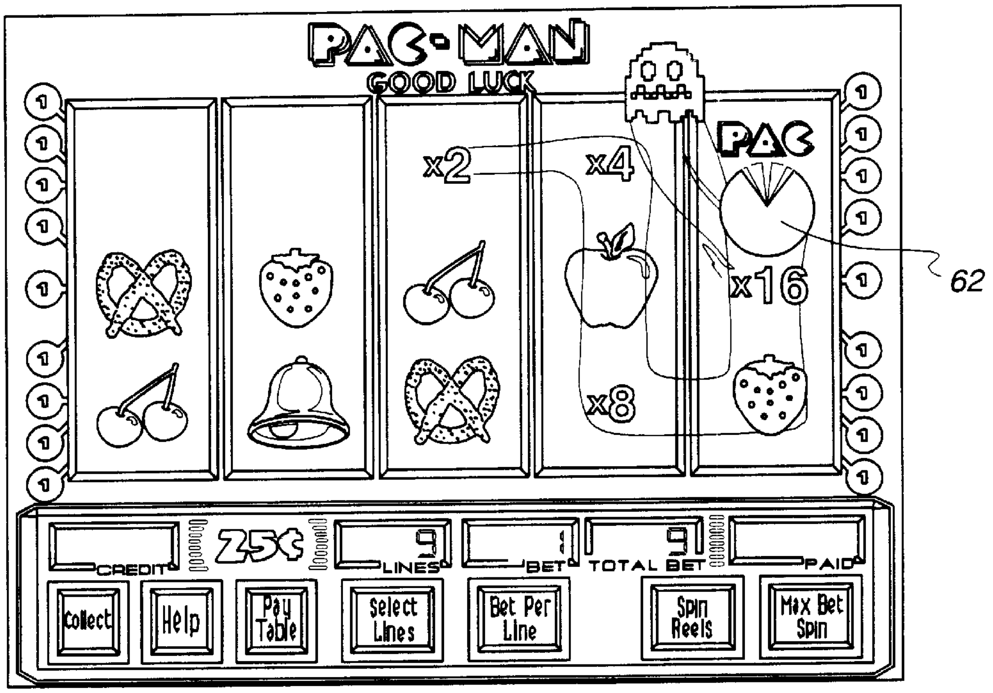

Referring to FIGS. 6 and 7, a "munch" bonus feature on the primary display 12 is triggered by a PAC-MAN symbol 62 and a string of one or more BLUE GHOST symbols 66 appearing adjacent to each other along an active pay line. The PAC-MAN symbol 62 visually consumes each BLUE GHOST symbol 66 in the adjacent string along the active pay line. A random bonus is awarded for each consumed BLUE GHOST symbol 66. In FIG. 6, for example, a PAC-MAN symbol 62 and a string of three BLUE GHOST symbols 66 appear adjacent to each other along the active pay line 46. In FIG. 7, the PAC-MAN symbol 62 is illustrated as already having consumed two of the three BLUE GHOST symbols 66 to reveal respective bonuses of 50 credits and 75 credits. The third BLUE GHOST symbol 66 will also reveal a bonus once it is consumed.

In an alternative embodiment depicted in FIGS. 8 and 9*a–c,* the "munch" bonus feature is modified so that it is triggered by a PAC-MAN symbol 62 on the first reel and a POWER PILL symbol 63 on the second reel. The PAC-MAN symbol 62 animates to visually consume the POWER PILL symbol 63 and then visually consumes each BLUE GHOST symbol 66 on the reels one at a time. Each consumed BLUE GHOST symbol 66 is replaced by a bonus in the form of a multiplier multiplied by the total wager. The bonus doubles for each consumed BLUE GHOST symbol 66. For example, if the bonus for the first consumed BLUE GHOST symbol 66 is the total wager multiplied by 2, the bonus for the second, third, and fourth BLUE GHOST symbols 66 is the total wager multiplied by 4, the total wager multiplied by 8, and the total wager multiplied by 16, respectively.

Figure 10:
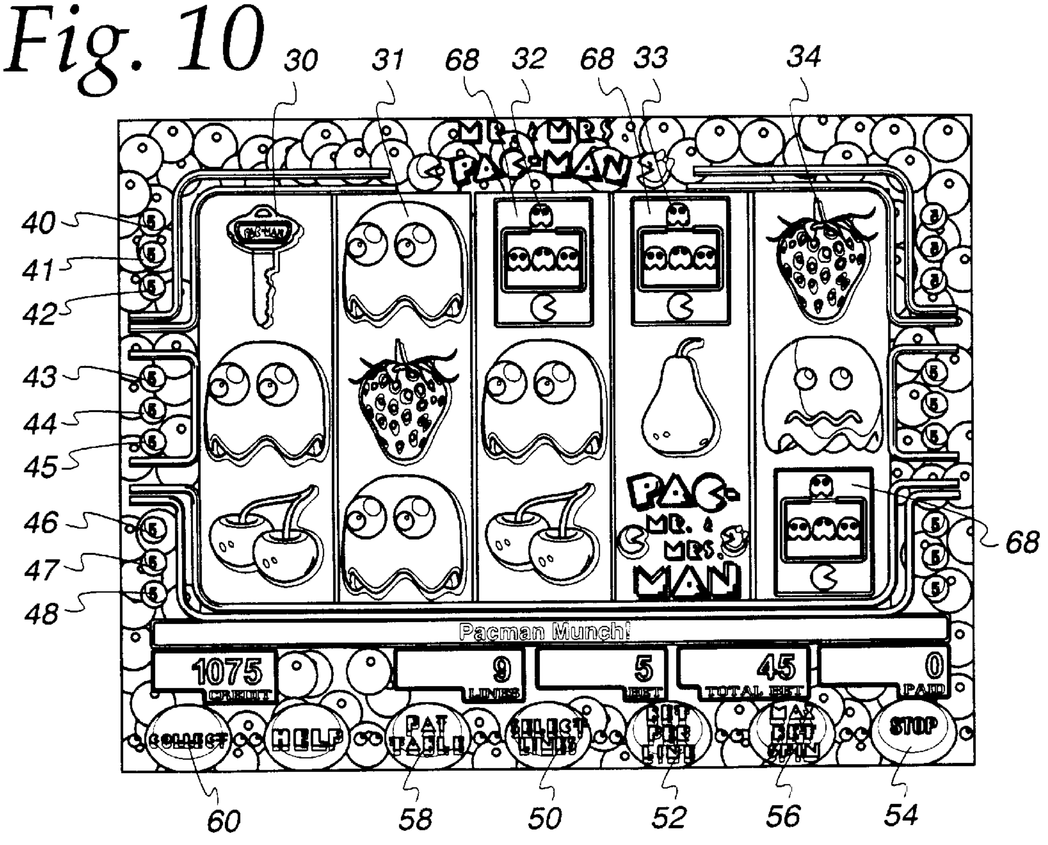
FIG. 10 is a display screen capture of a start-bonus combination in the basic slot game for triggering a maze-based bonus game.
Figure 11:
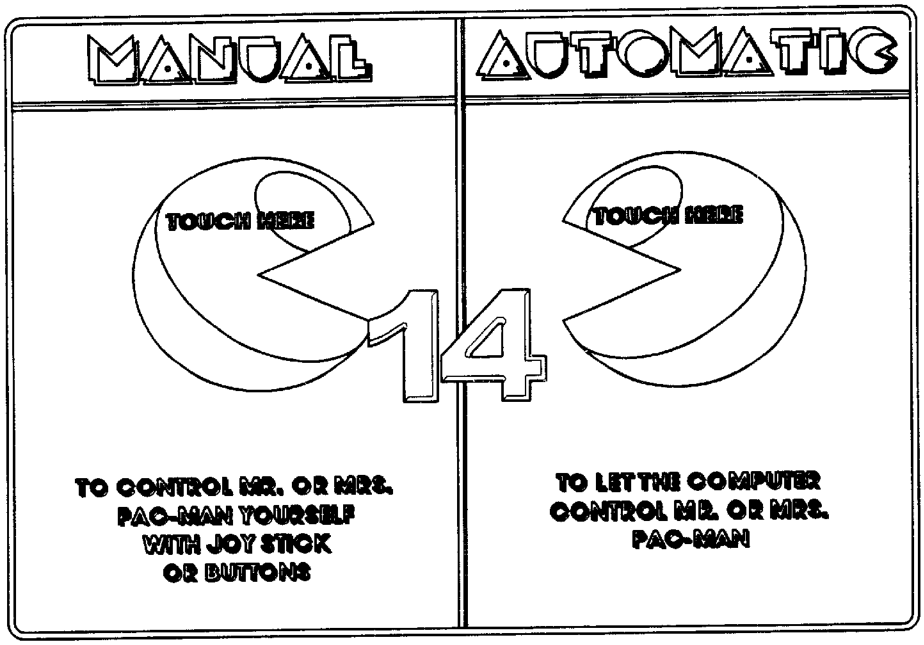
FIGS. 11–14 are display screen captures showing a first embodiment of the maze-based bonus game.

Referring to FIG. 10, a maze-based bonus game is triggered by three or more PAC-MAN HOUSE symbols 68 appearing anywhere on the primary display 12 regardless of whether the symbols are along an active pay line. Referring to FIG. 11, in the maze-based bonus game, the primary display 12 initially prompts the player to select either a "manual" or "automatic" play mode. In the "manual" mode, the player operates the joystick 11 or push-buttons on the button panel 15 (see FIG. 1) to control movement of a bonus-generating character through a maze. In the "automatic" mode, the CPU controls movement of the bonus-generating character through the maze. If the player fails to make a selection in the allotted time, the CPU defaults to the automatic mode.

Figure 12:
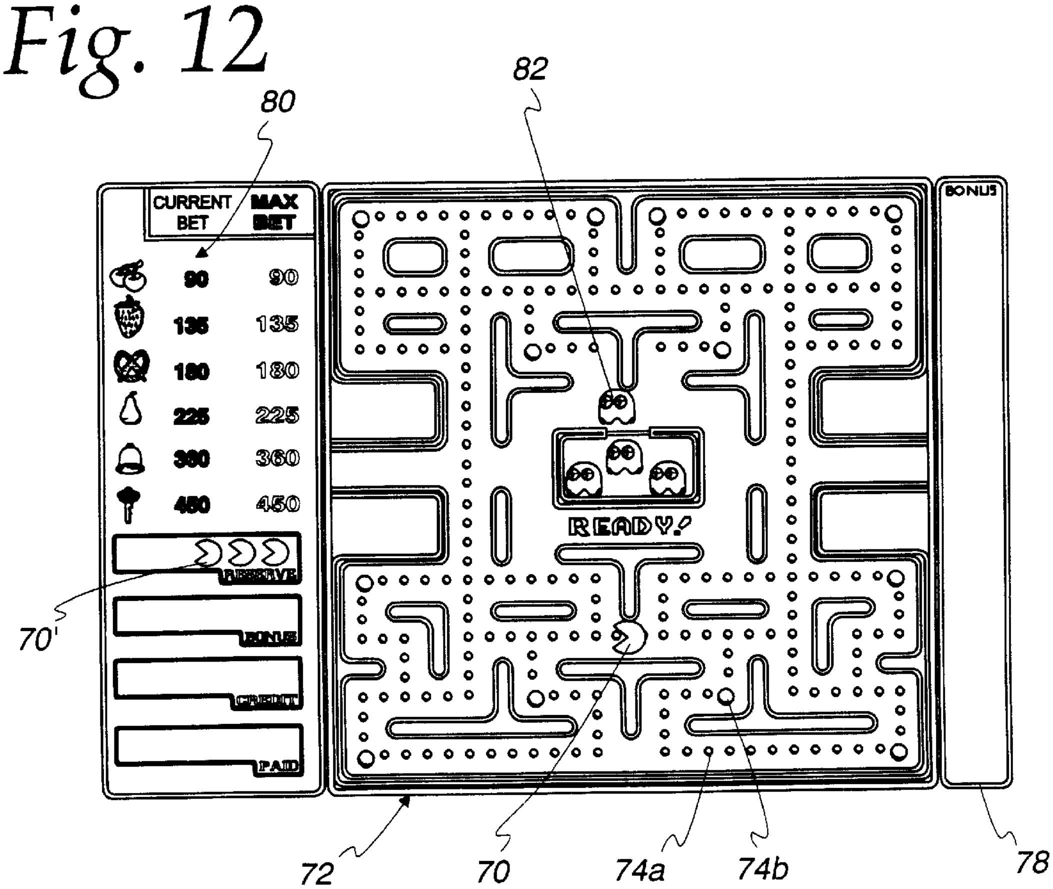
Figure 13:
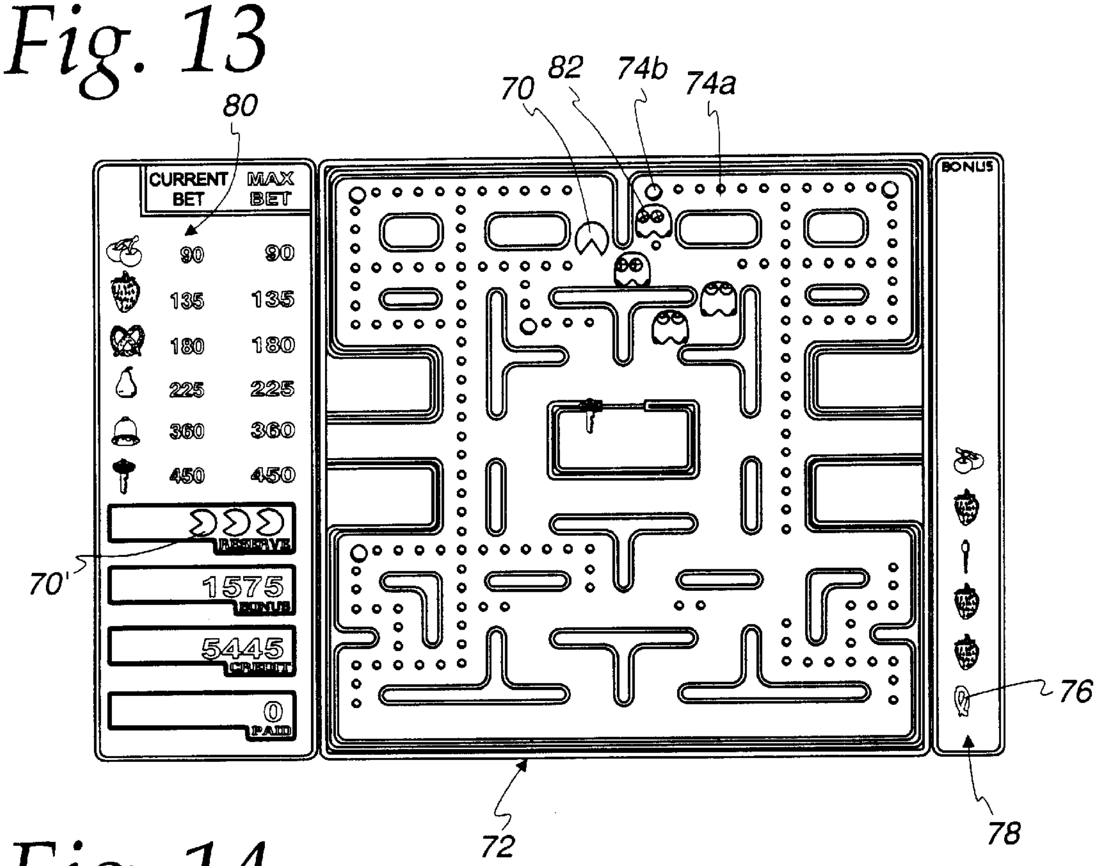
Figure 14:
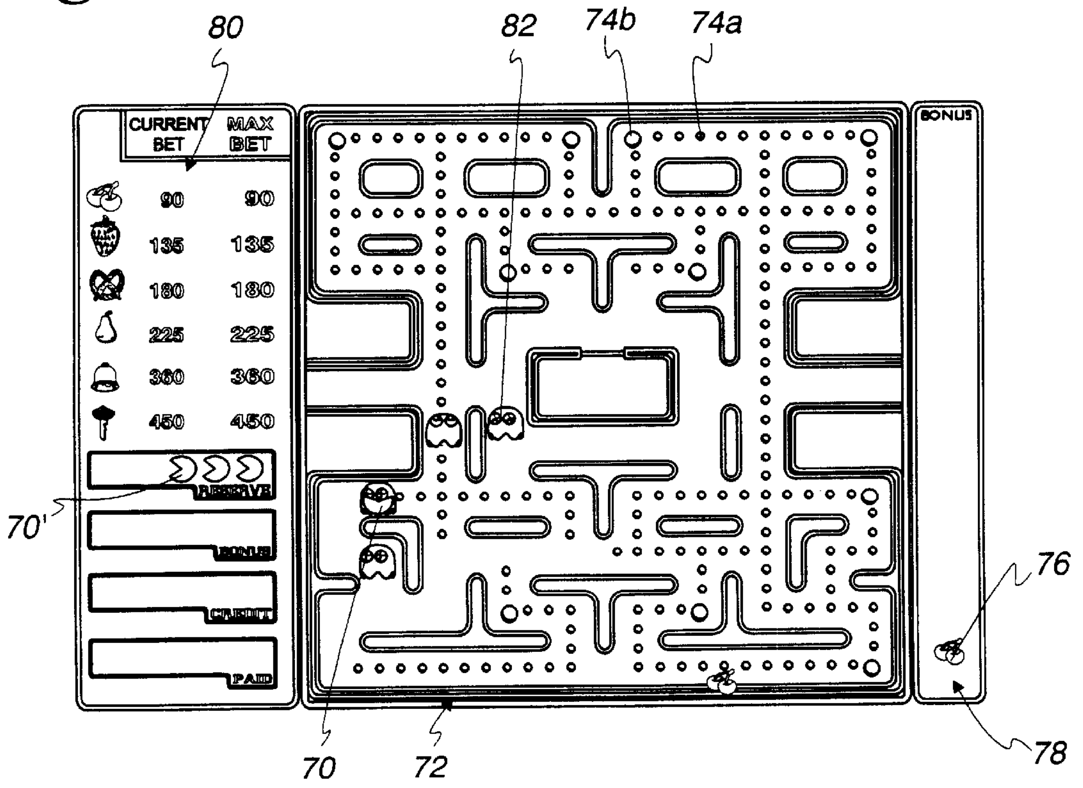

Referring to FIGS. 12, 13 and 14, the maze-based bonus game is preferably based on the PAC-MAN theme originally made popular in arcade games in the early 1980's. The bonus game includes a bonus-generating indicator depicted in this embodiment as a PAC-MAN character 70. The bonus-generating character 70 is placed within a field or maze 72 defined by a plurality of different intersecting paths on the secondary display 13. The maze 72 essentially has a two-dimensional appearance and is littered with a plurality of consumable elements in the form of small dots 74*a* and large dots 74*b*.

As the bonus-generating character 70 moves through the maze 72, the bonus-generating character 70 visually consumes the elements as it encounters them. Once consumed, some consumed elements, like the small dots 74*a,* may simply disappear and not generate any bonus. Other consumed elements, like the large dots 74*b,* however, may reveal respective payout icons 76 in a right column 78. A left column depicts a pay table 80 of the possible payout icons and their respective payouts. The player is awarded a bonus equal to the sum of the values of the payout icons 76 accumulated in the right column 78. In an alternative embodiment, the consumed large dots 74*b* transform or "morph" into respective bonus-received elements, such as payout icons or bonus amounts.

While the bonus-generating character 70 moves through the maze 72 and consumes the elements, the bonus-generating character 70 is pursued by one or more bonus-ending indicators 82. The bonus-ending indicator 82 is depicted in this embodiment as a ghost character 82. The bonus round generally ends in response to the bonus-ending character 82 intersecting the bonus-generating character 70. If there are additional bonus-generating characters 70' in reserve (i.e., the bonus-generating character has multiple lives), however, then the bonus round is preferably extended. One of the reserve bonus-generating characters 70' is either placed at a designated start position or in the position previously occupied by the bonus-generating character 70 within the partially consumed field of elements. The supply of reserve bonus-generating characters 70' is depleted by one each time one of the reserve characters 70' replaces a bonus-generating character 70 captured by a bonus-ending character 82. The reserve bonus-generating character 70' is then depicted as the bonus-generating character 70, and further continues to consume the elements.

If the remaining elements in the maze 72 are consumed, the maze-based bonus game may continue to a second level. At the second level, the image on the secondary display 13 may be graphically enhanced to have a three-dimensional appearance. The manner of play in the second level is similar to the manner of play in the first level, however, the maze configuration, characters, consumable elements, and/or payout icons may be modified. The player may be awarded a supplemental bonus for reaching the second level, and the large dots 74*b* at the second level may be worth more than the large dots 74*b* at the first level. The reserve bonus-gebnerating character 70' is then depicted as the bonus-generating character 70, and further continues to consume the elements 74.

If the remaining elements 74 in the maze 72 are consumed, the maze-based bonus game may continue to a second level. At the second level, the image on the secondary display 13 may be graphically enhanced to have a three-dimensional appearance. The manner of play in the second level is similar to the manner of play in the first level, however, the maze configuration, characters, consumable elements, and/or payout icons may be modified. The player may be awarded a supplemental bonus for reaching the second level, and the large dots 74*b* at the second level may be worth more than the large dots 74*b* at the first level.

Because the gaming machine operates a game of chance, not skill, the bonus amount awarded to the player by the maze-based bonus game is based on an outcome randomly selected by the CPU and/or the player. To enhance the player's experience, however, the player is given the opportunity to select the "manual" mode by which the player operates the joystick 11 or push-buttons on the button panel 15 (see FIG. 1) to control movement of the bonus-generating character 70 through the maze 72.

To ensure that the outcome is randomly selected while, at the same time, allowing the player to control movement of the bonus-generating character 70 in the "manual" mode, the CPU can control one or more variables "on the fly" during the bonus game that influence the outcome. For example, the pay table 80 may be eliminated, and the CPU can adjust the bonus associated with the consumed large dots 74*b*. Also, the CPU can control when the bonus-generating character 70 is captured by the bonus-ending character 82 by controlling the number, locations, and speed of the bonus-ending characters 82.

In accordance with one algorithm executed by the CPU, the objective is to allow the player to navigate the bonus-generating character 70 through the maze 72 to consume a predetermined number of large dots 74*b*, and then end the bonus game by capturing the bonus-generating character 70 with a bonus-ending character 82 after the player has collected the predetermined number of large dots 74*b*. Generally, the bonus-ending characters 82 traverse the maze 72, remaining near the bonus-generating character 70 but not capturing the bonus-generating character 70 until it has consumed the predetermined number of large dots 74*b*. After the bonus-generating character 70 has consumed the predetermined number of large dots 74*b*, the bonus-ending characters 82 promptly seek out and capture the bonus-generating character 70, thereby ending the bonus game before the bonus-generating character 70 can consume another large dot 74*b*.

More specifically, the algorithm works as follows. The maze 72 is described in two ways: (1) a graphical array that describes how the maze is laid out graphically, and (2) a node connectivity array that maps how the nodes connect. With respect to the (1) graphical array, because the maze has graphics placed on eight pixel boundaries, the maze may be described graphically by creating a 28×31 array of the maze and listing what graphical element occupies each eight pixel increment. For example, the maze portion in FIG. 15*a* relates to the graphical array portion in FIG. 15*b*. The key for the graphical array portion is as follows:

0=empty maze space

1=maze with a small dot 74*a*

2=maze with a large dot 74*b*

3=warp point

9=wall

At the beginning of the maze-based bonus game, an empty maze background is created and then filled up with small dots 74*a* or large dots 74*b* based on the array for the maze. The maze can be displayed at any resolution or size by increasing the pitch of the array (i.e., the number of pixels between graphical items).

With respect to the (2) node connectivity array, the algorithm is based on breaking the maze 72 into nodes for node-based travel. A "node" is any place in the maze where it is possible to change direction. An array of node connectivity is created for the maze showing how nodes connect with each other. The maze portion in FIG. 16*a* shows the location of nodes. The node connectivity array and glossary in FIG. 16*b* describes the connectivity of nodes for the maze portion in FIG. 16*a*. One can travel through the maze by navigating the node connectivity array in FIG. 16*b*. Most of the logic is performed when the bonus-generating character 70 or the bonus-ending character 82 is exactly on a pixel that represents a row and column boundary in the graphical array in FIG. 15*b*. The velocities of each of the characters 70 and 82 are evenly divisible into the distance between consumable elements. For example, if the small dots 74*a* are twelve pixels apart, each of the characters 70 and 82 should travel at either 1, 2, 1.5, or 3 pixels per frame.

When a bonus-generating character 70 is on an exact row and column boundary, the following algorithm steps are performed:

Check graphical array

If this spot contains a small dot 74*a:*

Delete dot, replace graphical array with a 0, make sound

If this spot contains a large dot 74*b:*

Delete dot, replace graphical array with a 0, make sound, create payout icon

Calculate which node character is on

Figure out which nodes are available

Calculate which node to choose

Calculate which direction to choose

Calculate new velocities

Calculate new sprite to display (based on direction faced)

If this spot is a warp node:

Transport to other warp node

When a bonus-ending character 82 is on an exact row and column boundary, the following algorithm steps are performed:

Check graphical array

Calculate which node character is on

Figure out which nodes are available

Calculate which node to choose

Calculate which direction to choose

Calculate new velocities

Calculate new sprite to display (based on direction faced)

If this spot is a warp node:

Transport to other warp node

The bonus-generating character 70 ("automatic" mode only) travels and searches the maze 72 based on the following algorithm steps:

Randomly choose a large dot 74*b* to head to

Look at all the nodes two steps from the node character is on (i.e., the nodes connected to the nodes connected to the node character is on), and figure out which one is closest to the large dot 74*b* character has set as its target.

Set the first of those two nodes as the character's next node

Head toward that node

Repeat until character is one node from targeted large dot

Consume targeted large dot

Choose next large dot

The bonus-ending characters 82 (both "manual" and "automatic" modes) travel and search the maze 72 based on the following algorithm steps:

Each bonus-ending character chooses one of the nodes connected to the node nearest the bonus-generating character (e.g., one bonus-ending character would pick the node north of the bonus-generating character, another bonus-ending character would pick the node east of the bonus-generating character, etc.)

The bonus-ending character would set that node as its ultimate target (for now), thereby keeping the bonus-ending characters from being stacked on top of each other Look at all the nodes two steps from the node character is on (i.e., the nodes connected to the nodes connected to the node character is on), and figure out which one is closest to its ultimate targeted node Set the first of those two nodes as the character's next node Head toward that node If the bonus-ending character 82 ever moves within a predetermined distance from the bonus-generating character 70, and the bonus-ending character 82 is either not yet allowed to capture the bonus-generating character 70 or is between the bonus-generating character 70 and its next node, the bonus-ending character 82 is directed back to the node it just came from. If the bonus-ending character 82 is not between the bonus-generating character 70 and its next node, the bonus-ending character 82 continues to its next node and then chooses any node other than the one toward the bonus-generating character 70. This prevents the bonus-ending character 82 from rapidly moving back and forth as it remains just outside the predetermined distance from the bonus-generating character 70.

If the bonus-ending character 82 ever moves within a predetermined distance from the bonus-generating character 70 and is allowed to capture the bonus-generating character 70, the algorithm checks if the bonus-ending character 82 is on the same row or column as the bonus-generating character 70 and revises the next node of the bonus-ending character 82 if necessary to be in the direction of the bonus-generating character 70.

The effect of the algorithm is that while the bonus-ending characters 82 are not allowed to capture the bonus-generating character 70 until the predetermined number of large dots 74*b* have been consumed, the bonus-ending characters 82 generally hover around the bonus-generating character 70 within a distance of about two nodes. Once the bonus-ending characters 82 are allowed to capture the bonus-generating character 70, they seek out the bonus-generating character 70 and usually capture the bonus-generating character 70 before the bonus-generating character 70 gets more than two or three nodes away. The bonus-ending characters 82 may be moved more rapidly when they are allowed to capture the bonus-generating character 70 to assure that the bonus-generating character 70 cannot get very far before being captured.

Prior to commencing movement of the characters in the maze-based bonus game, the CPU randomly selects the number of large dots 74*b* that the bonus-generating character 70 is allowed to consume. The bonus-ending characters 82 initially remain fairly far from the bonus-generating character 70. But when the bonus-generating character 70 has only a single large dot 74*b* remaining for consumption, the bonus-ending characters 82 are allowed to get a little closer to the bonus-generating character 70. When the bonus-generating character 70 has consumed the last large dot 74*b* that it is allowed to consume, according to the predetermined number, the bonus-ending characters 82 seek out the bonus-generating character 70 and usually capture the bonus-generating character 70 before the bonus-generating character 70 gets more than two or three nodes away.

Figure 17:
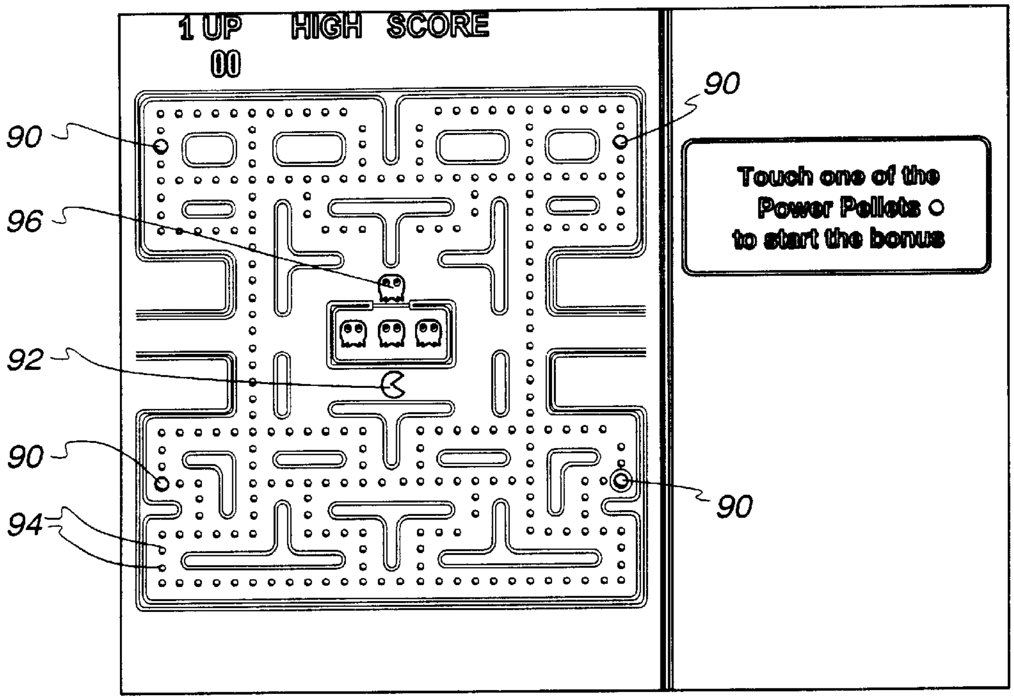
FIGS. 17–23 are display screen captures showing a second embodiment of the maze-based bonus game.
Figure 18:
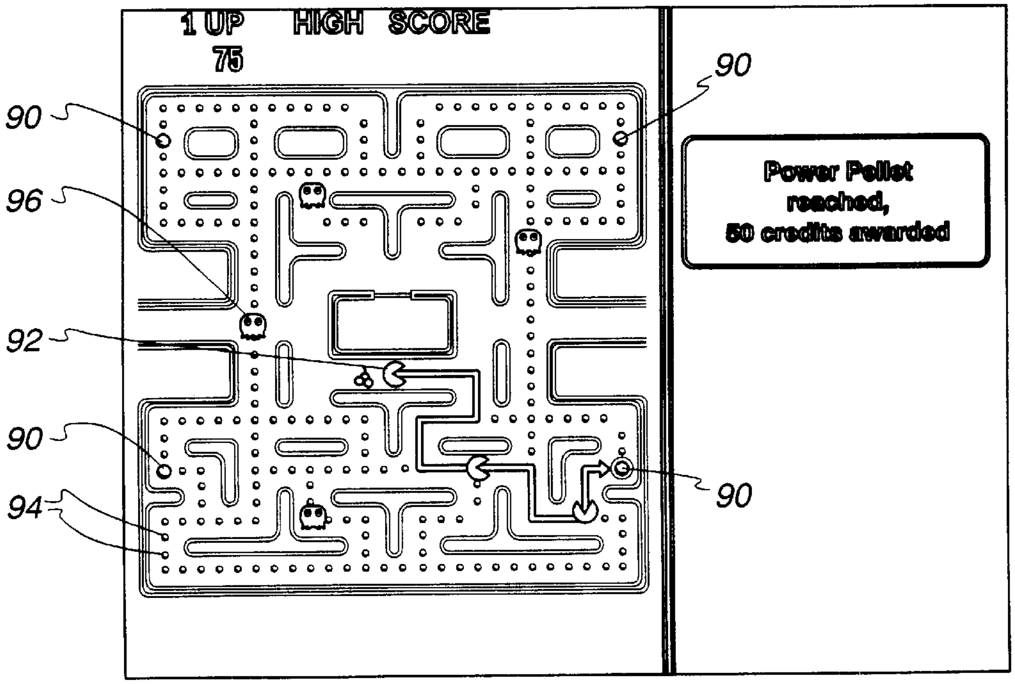

FIGS. 17–23 depict an alternative embodiment of the maze-based bonus game. Referring to FIG. 17, the bonus game commences in response to the player selecting one of the flashing power pellets 90. If the bonus game is depicted on the primary display 12 and such display is outfitted with a touch screen, the player may select a power pellet 90 by touching it. Referring to FIG. 18, the bonus-generating character 92 (e.g., PAC-MAN) takes a random path through the maze to the rejected power pellet 90. Each consumed small dot 94 along this path generates a bonus, such as one credit per dot, and each consumed power pellet 90 generates a larger bonus, such as fifty credits per power pellet.

Figure 19:
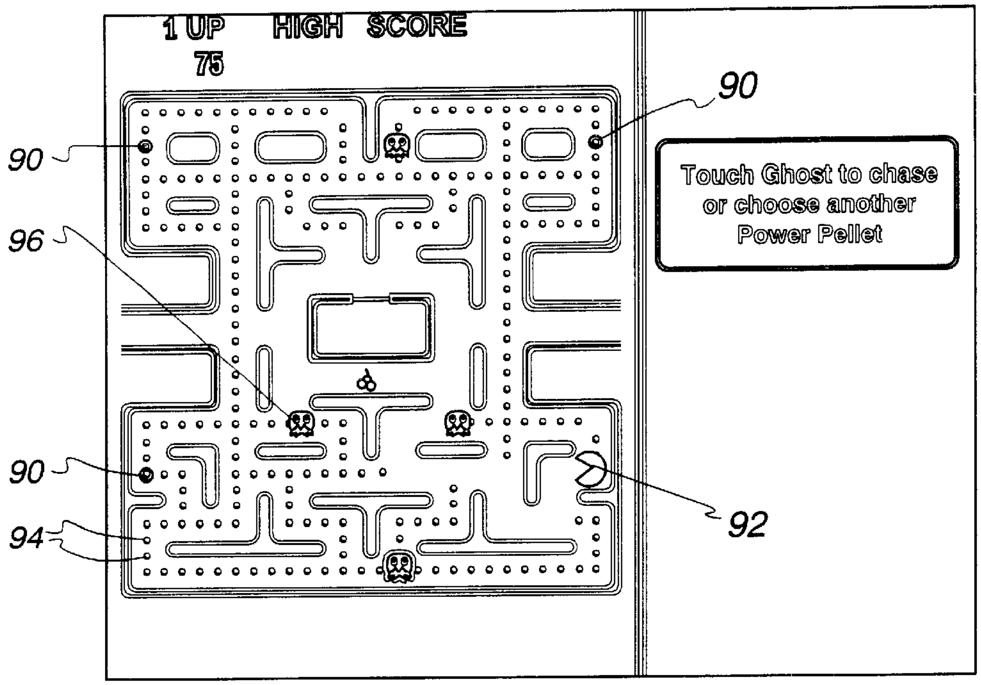
Figure 20:
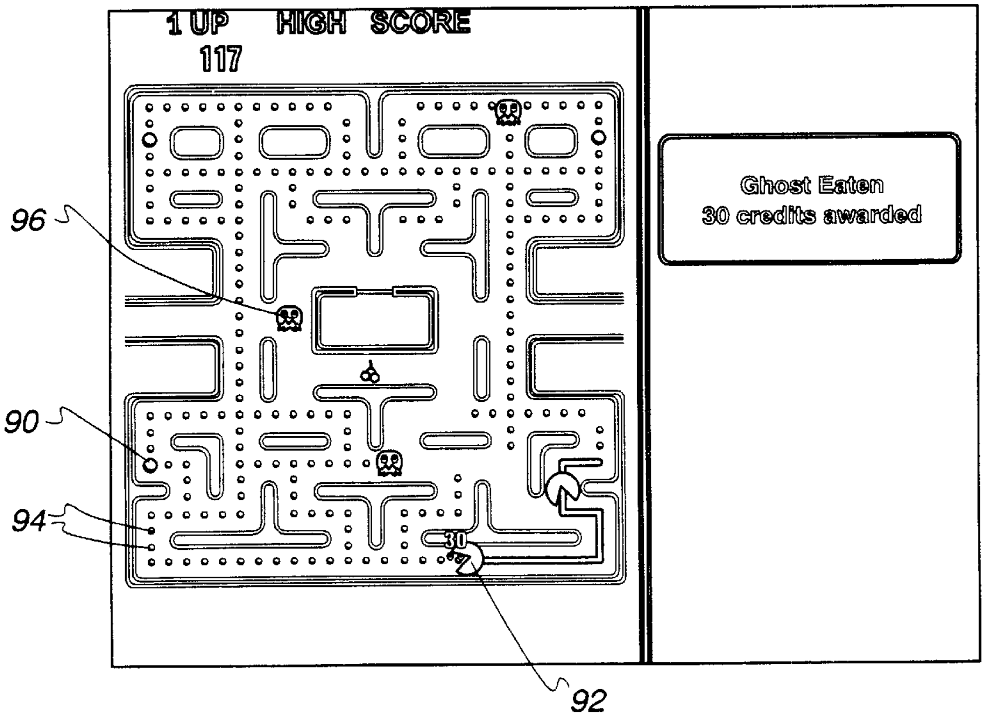

Referring to FIG. 19, upon consuming the power pellet 90, all bonus-ending characters 96 (e.g., ghosts) temporarily become consumable. While consumable, a bonus-ending character 96 may, for example, have a different shape or color than when non-consumable. The player is then prompted to select either one of the bonus-ending characters 96 or one of the remaining power pellets 90 as a new target. Referring to FIG. 20, in response to selecting one of the bonus-ending characters 96, the bonus-generating character 92 chases the selected bonus-ending character 96. If the selected bonus-ending character 96 is caught before it is no longer consumable, the bonus-ending character 96 is consumed and a bonus, such as thirty credits, is awarded. Each consumed dot 94 along the random path to the selected bonus-ending character 96 also generates a bonus.

Figure 21:
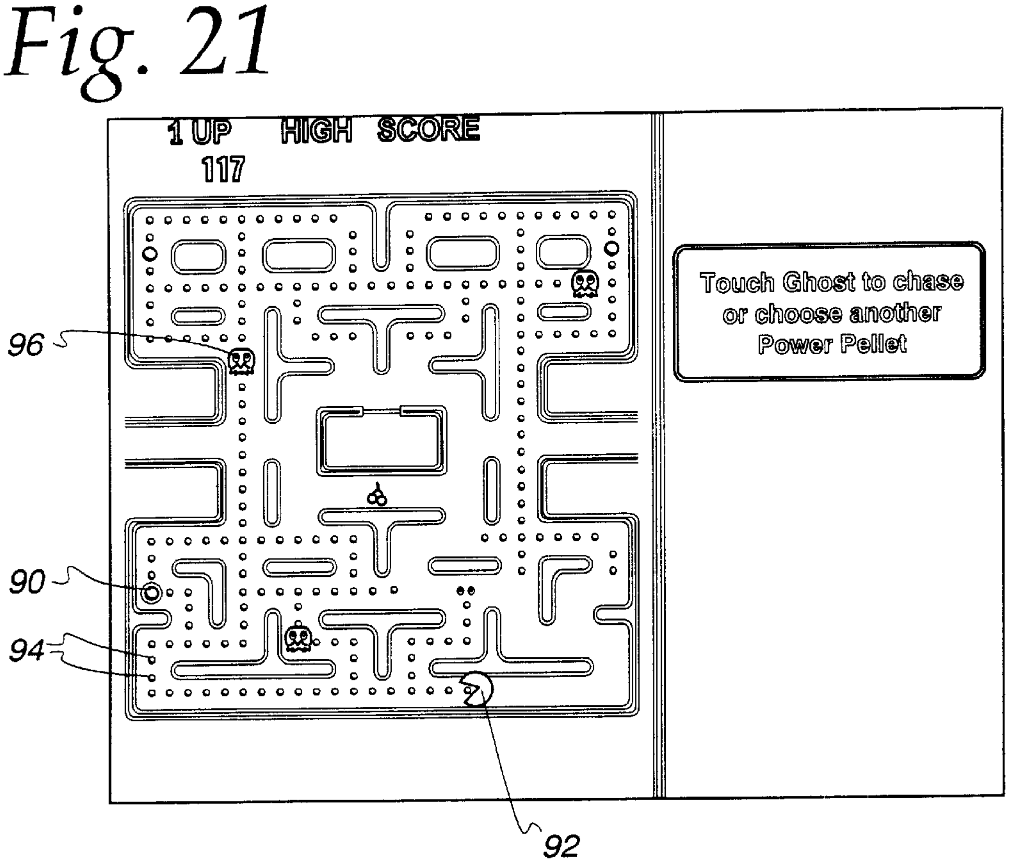
Figure 22:
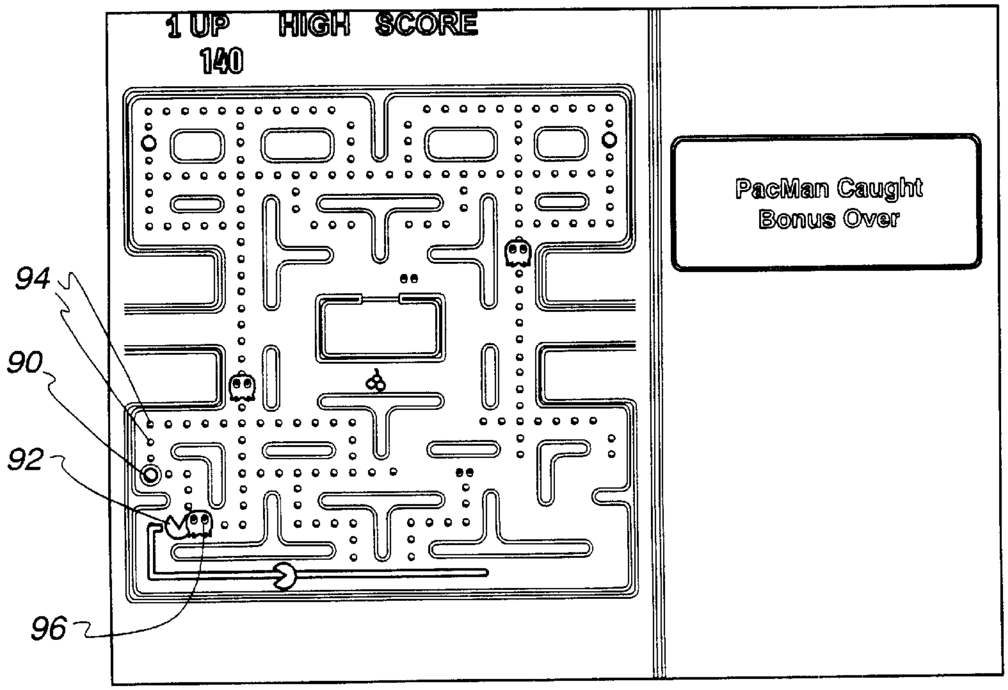
Figure 23:
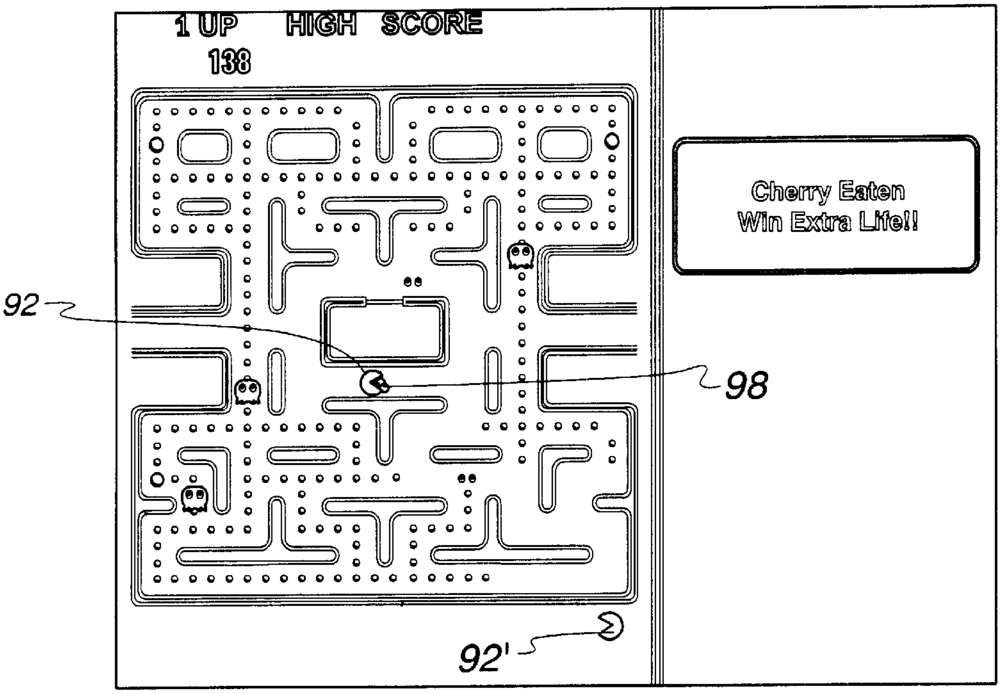

Referring to FIG. 21, upon consuming the selected bonus-ending character 96, the player is prompted to select either one of the remaining bonus-ending characters 96 or one of the remaining power pellets 90 as a new target. The bonus awarded for each consumed bonus-ending character 96 and each consumed power pellet 90 may increase with the number consumed. Referring to FIG. 22, the player continues to select bonus-ending characters 96 and power pellets 90 and collect corresponding bonuses until caught by a non-consumable bonus-ending character 96, which ends the bonus game. Referring to FIG. 23, if the path of the bonus-generating character 92 causes it to consume a fruit 98 at the center of the maze at any time during the bonus game, the CPU awards a reserve bonus-generating character 92' (i.e., an extra life) that prolongs the bonus game when it would otherwise end.

Figure 24:
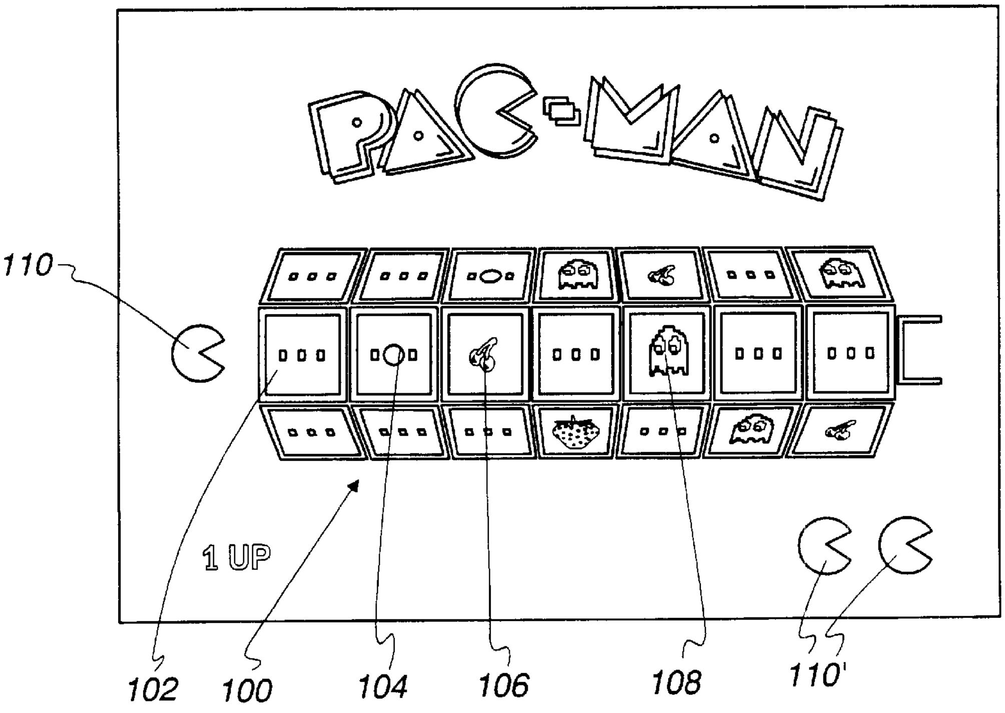
FIGS. 24–29 are display screen captures showing a reel-based bonus game.
Figure 25:
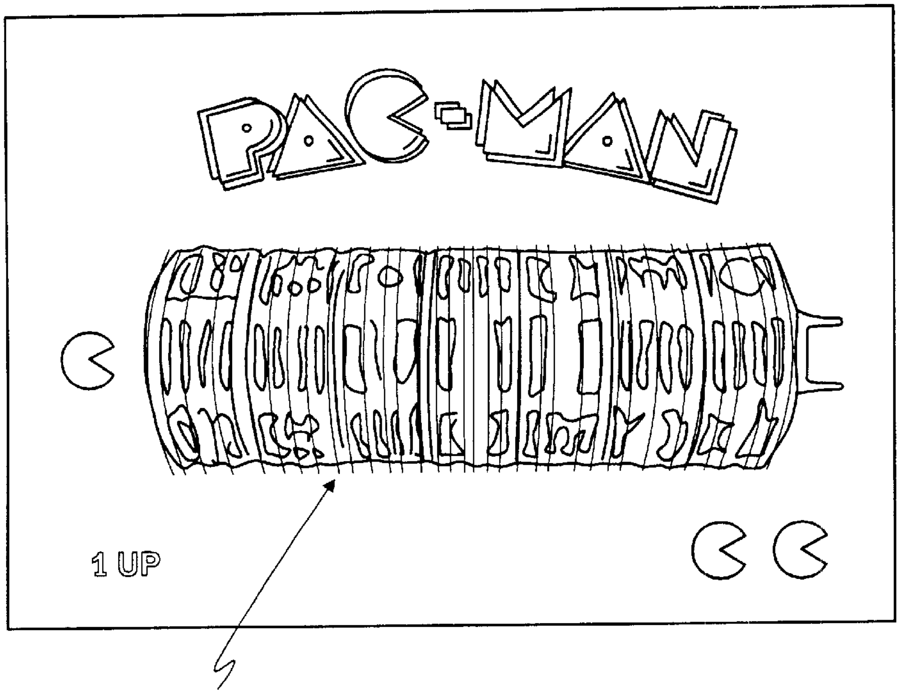
Figure 26:
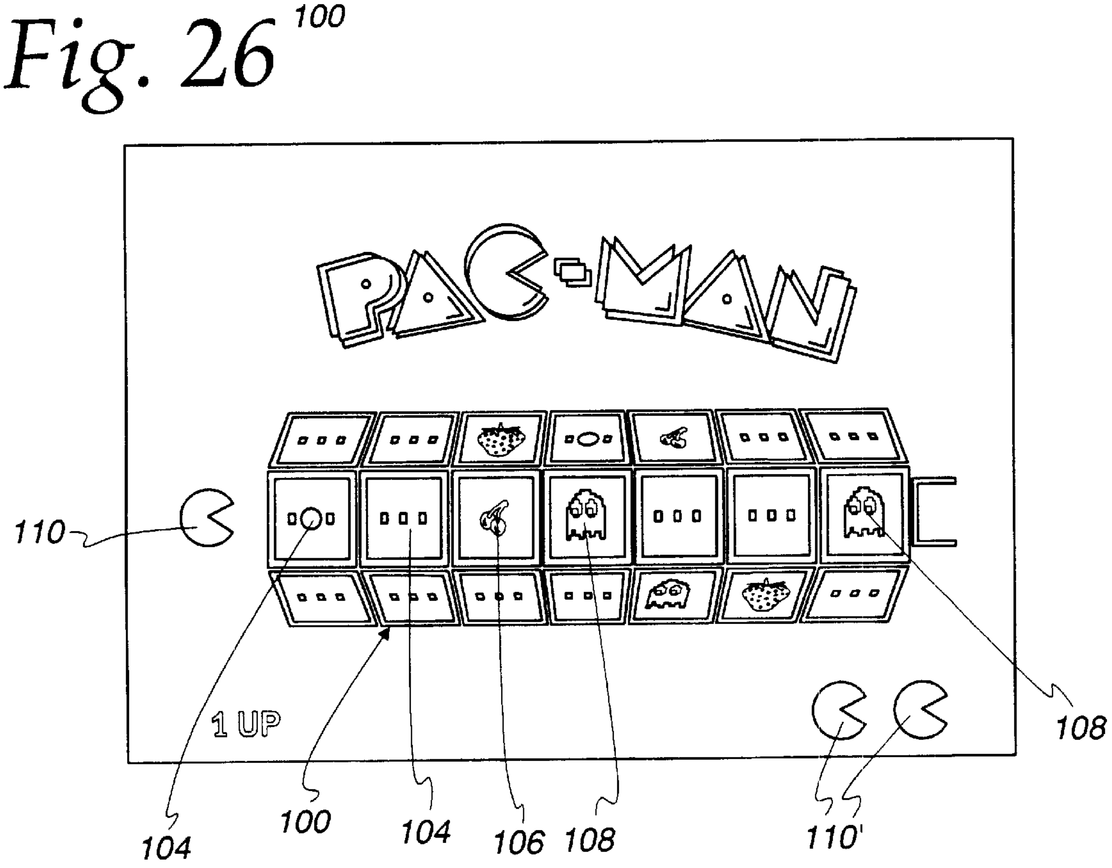
Figure 27:
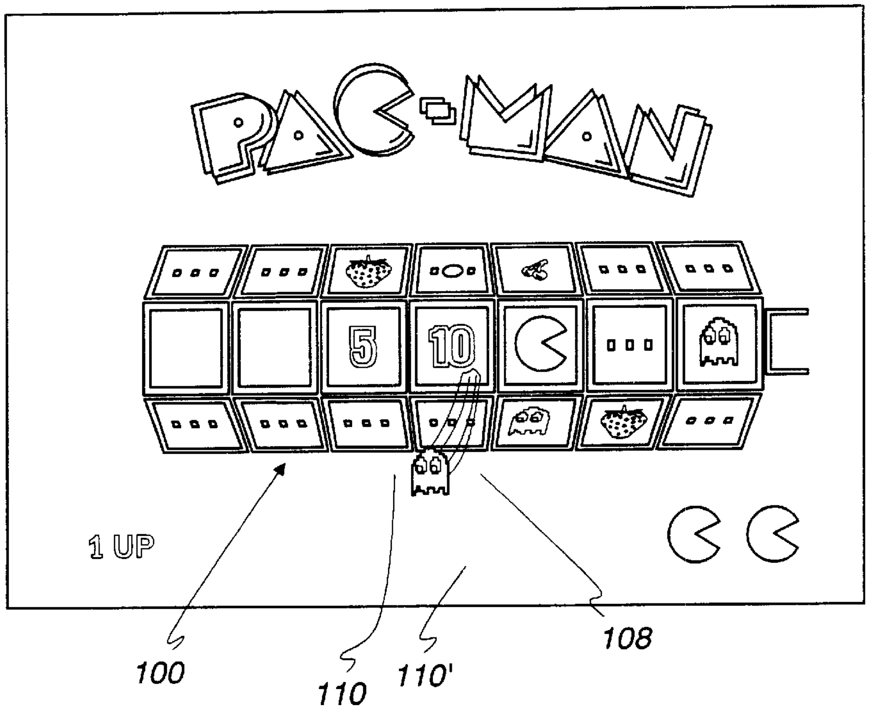

FIGS. 24–29 depict another alternative embodiment of the bonus game which does not employ a maze but rather employs a special set of simulated bonus slot reels 100. This bonus game may, for example, be triggered by three or more PAC-MAN symbols along an active pay line in the basic slot game. Referring to FIG. 24, the bonus reels 100 are illustrated as including seven reels bearing such symbols as a SMALL DOTS symbol 102, a POWER PILL symbol 104, a FRUIT symbol 106, and a GHOST symbol 108. At the beginning of the bonus game, a bonus-generating character 110 (e.g., PAC-MAN) has as many lives as there were PAC-MAN symbols in the symbol combination that triggered the bonus game. For example, if the bonus game was triggered by a symbol combination including three PAC-MAN symbols along an active pay line, the bonus-generating character 110 has three lives (i.e., two bonus-generating characters 110' in Referring to FIG. 25, the bonus reels 100 are spun and stopped in response to a "spin reels" key being pressed by the player. Referring to FIGS. 26 and 27, after the reels 100 stop, the bonus-generating character 110 moves horizontally across the center symbol on each bonus reel, starting from the leftmost bonus reel and proceeding toward the rightmost bonus reel. As the bonus-generating character 110 moves across the reels 100, it visually consumes the symbols that it can to generate respective bonuses in the form of credits. After consuming a POWER PILL symbol 104, the GHOST symbols 108 transform to a different shape or color (e.g., turn blue) to indicate that the bonus-generating character 110 can consume them. FIGS. 26 and 27, for example, illustrates the bonus-generating character 110 as having consumed a FRUIT symbol 106 and a blue GHOST symbol 108 to generate bonuses of 5 credits and 10 credits, respectively.

Figure 28:
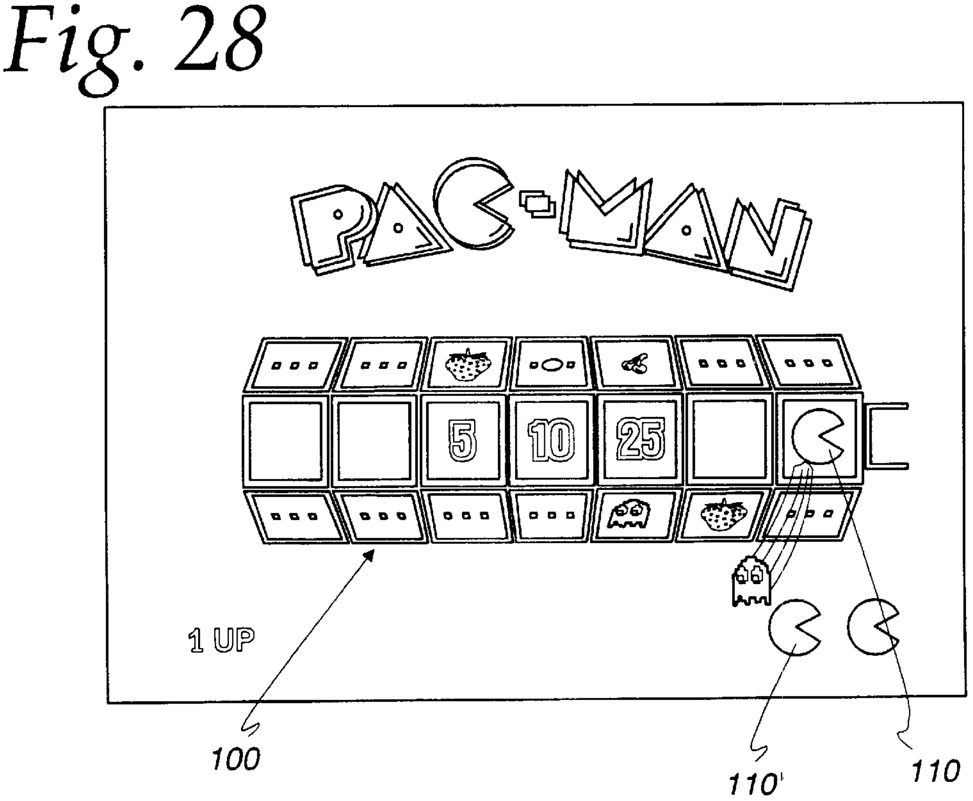
Figure 29:
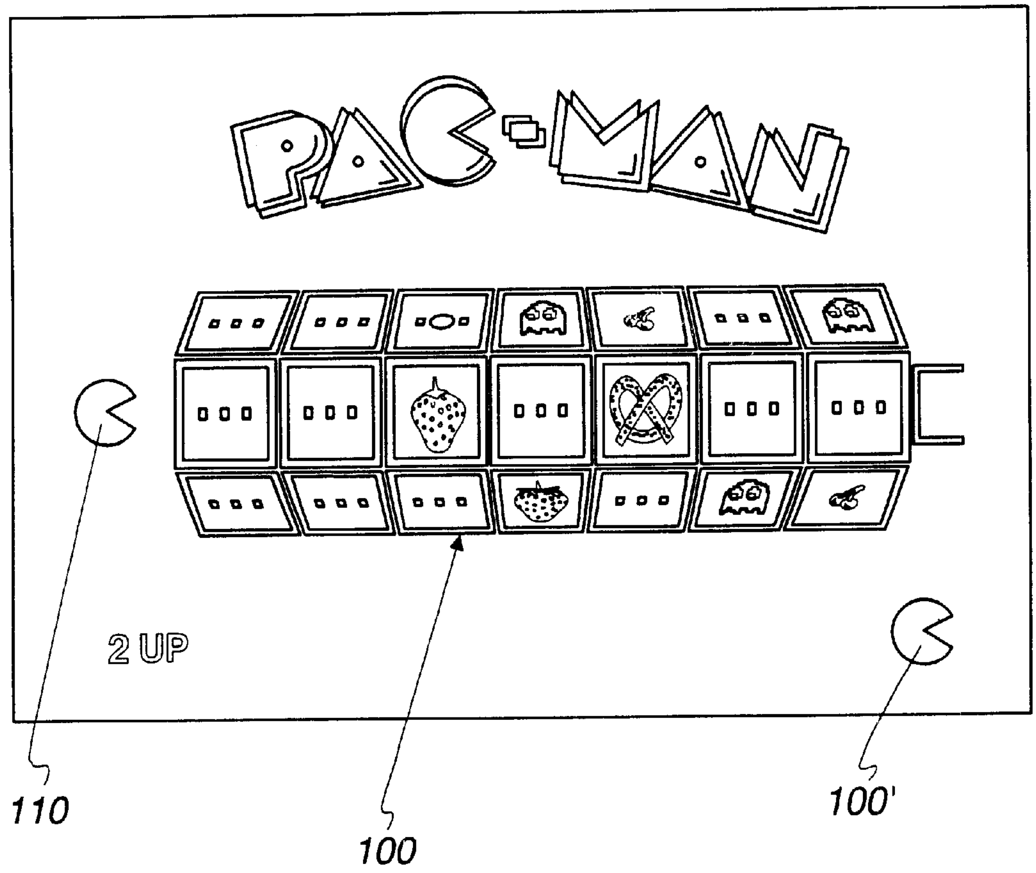

Referring to FIG. 28, if the bonus-generating character 110 successfully traverses all the bonus reels 100 without being consumed by a GHOST symbol 108, the bonus reels 100 are spun again with the same bonus-generating character 110 starting from the leftmost reel. Referring to FIG. 29, if the bonus-generating character 110 encounters a GHOST symbol 108 without first consuming a POWER PILL symbol 104, however, the bonus-generating character 110 is consumed by the GHOST symbol 108. The bonus reels 100 are then spun again with the bonus-generating character 110 replaced by one of the reserve bonus-generating characters 110'. The bonus game ends in response to the bonus-generating character 110 being consumed without any bonus-generating characters 110' in reserve.

As noted above, various bonus game embodiments may include one or more levels and zero or more reserve bonus-generating characters (e.g., reserve PAC-MAN's). If the bonus game allows for multiple levels and/or reserve bonus-generating characters, the number of levels and the number of reserve bonus-generating characters may be determined by a variety of factors, such as the type, quantity, and configuration of symbols in the start-bonus outcome that triggered the bonus game. Less common start-bonus outcomes may generally result in a greater number of levels and/or a greater number of reserve bonus-generating characters. For example, a start-bonus combination consisting of four or five matching symbols may trigger a bonus game with more levels and/or more reserve bonus-generating characters than a bonus game triggered by three matching symbols. A start-bonus combination consisting of one type of matching symbols may trigger a bonus game with a different number of levels and/or reserve bonus-generating characters than a bonus game triggered by a second type of matching symbols. A start-bonus combination including, among other things, a wild symbol may trigger a bonus game with more levels and/or reserve bonus-generating characters than a bonus game triggered by a combination without the wild symbol. A start-bonus combination along an active pay line may trigger a bonus game with more levels and/or reserve bonus-generating characters than a bonus game triggered by a scattered start-bonus combination appearing on the display but not along an active pay line. Although one level must generally be completed before the bonus game proceeds to a succeeding level, the bonus game may be programmed to skip one or more lower levels if triggered by certain start-bonus outcomes.

In addition, certain basic game outcomes that are not start-bonus outcomes may earn reserve bonus-generating characters for use in the bonus game. This serves as an incentive for a player to continue playing the gaming machine so that the player can take advantage of the supply of reserve bonus-generating characters earned in the basic game. As discussed above, the reserve bonus-generating characters prolong the bonus game and, therefore, tend to increase the amount of the bonus accumulated in the bonus game.

While the present invention has been described with reference to one or more particular embodiments, those skilled in the art will recognize that many changes may be made thereto without departing from the spirit and scope of the present invention. For example, the basic game need not comprise a spinning reel slot game as illustrated in FIG. 1, but may comprise virtually any type of game of chance or skill or combination of games having outcomes (e.g., start-bonus outcomes) that trigger play of a bonus game on one or more displays. For example, the basic game may comprise a video poker or blackjack game. Also, the maze-based bonus game may be implemented as a stand-alone basic game that is not triggered by a start-bonus outcome on spinning reels. Each of these embodiments and obvious variations thereof is contemplated as falling within the spirit and scope of the claimed invention, which is set forth in the following claims.

What is claimed is:

1. A game of chance for a gaming machine controlled by a processor in response to a wager, comprising:

a basic game including a plurality of possible randomly-selected basic game outcomes, the plurality of possible basic game outcomes including a start-bonus outcome; and a maze-based bonus game triggered by the start-bonus outcome and indicated on a visual display, the bonus game including a bonus-generating indicator movable along a plurality of different intersecting paths containing a plurality of consumable elements, the bonus-generating indicator generating an award based on a randomly-selected bonus game outcome as the bonus-generating indicator visually consumes the elements; and at least one bonus-ending indicator movable along the plurality of different intersecting paths, said bonus game ending in response to said bonus-ending indicator intersecting said bonus-generating indicator; and a player interface to allow a player to manually control the direction of movement of said bonus-generating indicator along the plurality of different intersecting paths;

wherein said processor determines the outcome of the bonus game and entirely controls the movement of the bonus-ending indicator along the plurality of different intersecting paths to achieve the bonus game outcome determined by said processor regardless of the directional control exerted by the player over said bonus-generating indicator through said player interface.

2. The game of claim 1, wherein the plurality of different paths define a maze.

3. The game of claim 1, wherein the processor substantially controls when the bonus-ending indicator intersects the bonus-generating indicator in accordance with a predetermined outcome.

4. The game of claim 1, wherein at a beginning of the bonus game the bonus-generating indicator and the bonus-ending indicator are located in different areas of the plurality of paths.

5. The game of claim 1, wherein the basic game includes a plurality of symbol-bearing reels rotated and stopped to place objects on the reels in visual association with one or more pay lines.

6. The game of claim 5, wherein the reels are simulated on a video display.

7. The game of claim 1, wherein the bonus-generating indicator stops consuming the elements in response to being intersected by a bonus-ending indicator also moving along the plurality of different intersecting paths.

8. The game of claim 7, wherein the bonus-ending indicator intersects the bonus-generating indicator after the bonus-generating indicator visually consumes a predetermined number of consumable elements.

9. The game of claim 8, wherein the predetermined number of consumable elements is based on the randomly selected bonus game outcome.

10. The game of claim 1, wherein the bonus game includes one or more bonus rounds, one of the rounds of the bonus game ending in response to the bonus-ending indicator intersecting the bonus-generating indicator.

11. The game of claim 10, wherein the bonus-ending indicator intersects the bonus-generating indicator after the bonus-generating indicator visually consumes a predetermined number of consumable elements.

12. The game of claim 10, further including a reserve bonus-generating indicator, and wherein the bonus-generating indicator is replaced with the reserve bonus-generating indicator for a succeeding round of the bonus game after the one of the rounds of the bonus game ends.

13. The game of claim 12, wherein the plurality of basic game outcomes includes a reserve bonus-resource outcome that earns the reserve bonus-generating indicator for use in the bonus game.

14. A game of chance for a gaming machine controlled by a processor in response to a wager, comprising:

a basic game including a plurality of possible randomly-selected basic game outcomes, the plurality of possible basic game outcomes including a start-bonus outcome; and a maze-based bonus game triggered by the start-bonus outcome and indicated on a visual display, the bonus game including a bonus-generating indicator movable along a plurality of different intersecting paths containing a plurality of consumable elements, the bonus-generating indicator generating an award based on a randomly-selected bonus game outcome as the bonus-generating indicator visually consumes the elements; and at least one bonus-ending indicator movable along the plurality of different intersecting paths, said bonus game ending in response to said bonus-ending indicator intersecting said bonus-generating indicator;

wherein said processor determines the outcome of the bonus game and entirely controls the movement of both the bonus-generating indicator and the bonus-ending indicator along the plurality of different intersecting paths to achieve the bonus game outcome determined by said processor.

15. The game of claim 14, wherein the plurality of different paths define a maze.

16. The game of claim 14, wherein the processor substantially controls when the bonus-ending indicator intersects the bonus-generating indicator in accordance with a predetermined outcome.

17. The game of claim 14, wherein at a beginning of the bonus game the bonus-generating indicator and the bonus-ending indicator are located in different areas of the plurality of paths.

18. The game of claim 14, wherein the basic game includes a plurality of symbol-bearing reels rotated and stopped to place objects on the reels in visual association with one or more pay lines.

19. The game of claim 18, wherein the reels are simulated on a video display.

20. The game of claim 14, wherein the bonus-generating indicator stops consuming the elements in response to being intersected by a bonus-ending indicator also moving along the plurality of different intersecting paths.

21. The game of claim 20, wherein the bonus-ending indicator intersects the bonus-generating indicator after the bonus-generating indicator visually consumes a predetermined number of consumable elements.

22. The game of claim 21, wherein the predetermined number of consumable elements is based on the randomly selected bonus game outcome.

23. The game of claim 14, wherein the bonus game includes one or more bonus rounds, one of the rounds of the bonus game ending in response to the bonus-ending indicator intersecting the bonus-generating indicator.

24. The game of claim 23, wherein the bonus-ending indicator intersects the bonus-generating indicator after the bonus-generating indicator visually consumes a predetermined number of consumable elements.

25. The game of claim 23, further including a reserve bonus-generating indicator, and wherein the bonus-generating indicator is replaced with the reserve bonus-generating indicator for a succeeding round of the bonus game after the one of the rounds of the bonus game ends.

26. The game of claim 25, wherein the plurality of basic game outcomes includes a reserve bonus-resource outcome that earns the reserve bonus-generating indicator for use in the bonus game.

27. A maze-based game of chance for a gaming machine controlled by a processor in response to a wager, comprising an award-generating indicator movable along a plurality of different intersecting paths containing a plurality of consumable elements, the award-generating indicator generating an award based on a randomly selected outcome as the award-generating indicator visually consumes the elements.

28. The game of claim 27, wherein a direction of movement of the award-generating indicator is controlled by the processor.

29. The game of claim 27, further including a reserve award-generating indicator, and wherein the award-generating indicator is replaced with the reserve award-generating indicator for a succeeding round of the game after a preceding round of the game ends.

30. The game of claim 27, wherein a player via a player interface controls the direction of movement of the award-generating indicator.

31. The game of claims 30, where in the player interface includes a joystick.

32. The game of claim 27, wherein the award-generating indicator is chased by at least one award-ending indicator, the game ending in response to the award-generating indicator being caught by the award-ending indicator.

33. The game of claim 32, wherein a direction of movement of the award-generating indicator is controlled by a player via a player interface, while movement of the award-ending indicator is controlled by the processor.

34. The game of claim 27, wherein the award-generating indicator stops consuming the elements in response to being intersected by an award-ending indicator also moving along the plurality of different intersecting paths.

35. The game of claim 34, wherein the processor substantially controls when the award-ending indicator intersects the award-generating indicator in accordance with a predetermined outcome.

36. The game of claim 34, wherein at a beginning of the game the award-generating indicator and the award-ending indicator are located in different areas of the plurality of paths.

37. The game of claim 34, wherein the movement of the award-ending indicator is controlled by the processor.

38. The game of claim 34, wherein the award-ending indicator intersects the award-generating indicator after the award-generating indicator visually consumes a predetermined number of consumable elements.

39. The game of claim 38, wherein the predetermined number of consumable elements is based on the randomly selected outcome.

40. A method of conducting a maze-based game of chance on a processor-controlled gaming machine, comprising:

receiving a wager;

depicting an award-generating indicator moving through a maze defined by a plurality of different intersecting paths, the plurality of paths containing a plurality of consumable elements; and generating an award based on a randomly selected outcome as the award-generating indicator visually consumes the elements.

41. The method of claim 40, further including depicting at least one award-ending indicator chasing the award-generating indicator, and ending the game in response to the award-generating indicator being caught by the award-ending indicator.

42. The method of claim 41, wherein a direction of movement of the award-generating indicator is controlled by a player via a player interface, while movement of the award-ending indicator is controlled by the processor.

43. The method of claim 41, wherein the award-ending indicator catches the award-generating indicator after the award-generating indicator visually consumes a predetermined number of consumable elements.

44. The method of claim 43, wherein the predetermined number of consumable elements is based on the randomly selected outcome.

* * * * *

UNITED STATES PATENT AND TRADEMARK OFFICE

CERTIFICATE OF CORRECTION

PATENT NO. : 6,554,704 B2
DATED : April 29, 2003
INVENTOR(S) : Nicastro ll et al.

It is certified that error appears in the above-identified patent and that said Letters Patent is hereby corrected as shown below:

Title page,
Item [75], Inventors, delete "John P. Nicastro, Chicago, IL (US); John P. Nicastro, II, Chicago, IL (US)" and insert -- John P. Nicastro, II, Naperville, IL (US); John P. Nicastro, Chicago, IL (US) --

Signed and Sealed this

Thirty-first Day of August, 2004

JON W. DUDAS
*Director of the United States Patent and Trademark Office*